(12) United States Patent
Makino

(10) Patent No.: US 8,281,685 B2
(45) Date of Patent: Oct. 9, 2012

(54) PEDAL MODULE

(75) Inventor: Masahiro Makino, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 1179 days.

(21) Appl. No.: 11/702,580

(22) Filed: Feb. 6, 2007

(65) Prior Publication Data

US 2007/0180946 A1 Aug. 9, 2007

(30) Foreign Application Priority Data

Feb. 9, 2006 (JP) .................................. 2006-32712

(51) Int. Cl.
*G05G 1/30* (2008.04)
(52) U.S. Cl. .......................................... 74/512; 74/513
(58) Field of Classification Search ............ 74/512–514, 74/560; 324/207.25; B60K 26/02
See application file for complete search history.

(56) References Cited

U.S. PATENT DOCUMENTS

| 5,529,296 | A | | 6/1996 | Kato et al. | |
|---|---|---|---|---|---|
| 5,937,707 | A | * | 8/1999 | Rixon et al. ................... | 74/560 |
| 6,003,404 | A | * | 12/1999 | Hannewald .................... | 74/512 |
| 6,070,490 | A | * | 6/2000 | Aschoff et al. ................. | 74/513 |
| 6,523,433 | B1 | * | 2/2003 | Staker .............................. | 74/513 |
| 7,012,423 | B2 | * | 3/2006 | Hasegawa et al. ....... | 324/207.25 |
| 7,404,342 | B2 | * | 7/2008 | Wurn .............................. | 74/512 |
| 2001/0029805 | A1 | * | 10/2001 | Wehner et al. .................. | 74/513 |
| 2002/0152831 | A1 | * | 10/2002 | Sakamoto et al. ............. | 74/512 |
| 2003/0070503 | A1 | * | 4/2003 | Menzies ........................ | 74/513 |
| 2004/0065167 | A1 | | 4/2004 | Kim | |
| 2007/0000347 | A1 | * | 1/2007 | Keown et al. ................... | 74/560 |
| 2009/0183589 | A1 | * | 7/2009 | Watanabe et al. ............... | 74/513 |
| 2012/0006145 | A1 | * | 1/2012 | Hotta et al. ..................... | 74/513 |
| 2012/0085196 | A1 | * | 4/2012 | Watanabe ....................... | 74/513 |

FOREIGN PATENT DOCUMENTS

| DE | 197 55 098 | | 6/1999 |
|---|---|---|---|
| DE | 198 11 442 | | 9/1999 |
| DE | 198 48 091 | | 4/2000 |
| DE | 100 33 297 | | 11/2001 |
| EP | 1033275 A2 | * | 9/2000 |
| JP | 60-10940 | | 1/1985 |
| JP | H09-034575 A | | 2/1997 |
| JP | 2001-526818 | | 12/2001 |
| JP | 2004-90755 | | 3/2004 |
| WO | WO 99/47986 | * | 9/1999 |

OTHER PUBLICATIONS

JP 2004-90755 Translation from USPTO STIC # PTO 11-0531.*
STIC Translation of JP 60-10940, Masashi Ohta, Jan. 25, 1985.*

(Continued)

*Primary Examiner* — Vinh T. Luong
(74) *Attorney, Agent, or Firm* — Nixon & Vanderhye PC

(57) ABSTRACT

A pedal is rotated in a forward rotational direction by a pedal force applied from a driver and is rotated in a reverse rotational direction by a restoring force exerted from a double coil spring arrangement. A friction member generates friction between the pedal and the friction member. The friction member includes a sliding part, a holding part and a resiliently deformable part. The sliding part slidably engages the pedal, and the holding part is held by a housing. The resiliently deformable part is resiliently deformable between the sliding part and the holding part to permit displacement of the sliding part relative to the holding part.

9 Claims, 17 Drawing Sheets

OTHER PUBLICATIONS

Machine translation of WO/1999/047986, Herden et al., Sep. 23, 1999.*

German Office Action dated May 4, 2010, issued in corresponding German Application No. 10 2007 000 082.2-26, with English translation.

Japanese Office Action dated Jun. 24, 2010, issued in corresponding Japanese Application No. 2006-032712, with English translation.

German Office Action dated Oct. 21, 2009, issued in corresponding German Application No. 10 2007 000 082.2-26, with English translation.

Japanese Examination Report dated Jan. 11, 2011, re JP 2006-032712 (with English translation).

* cited by examiner

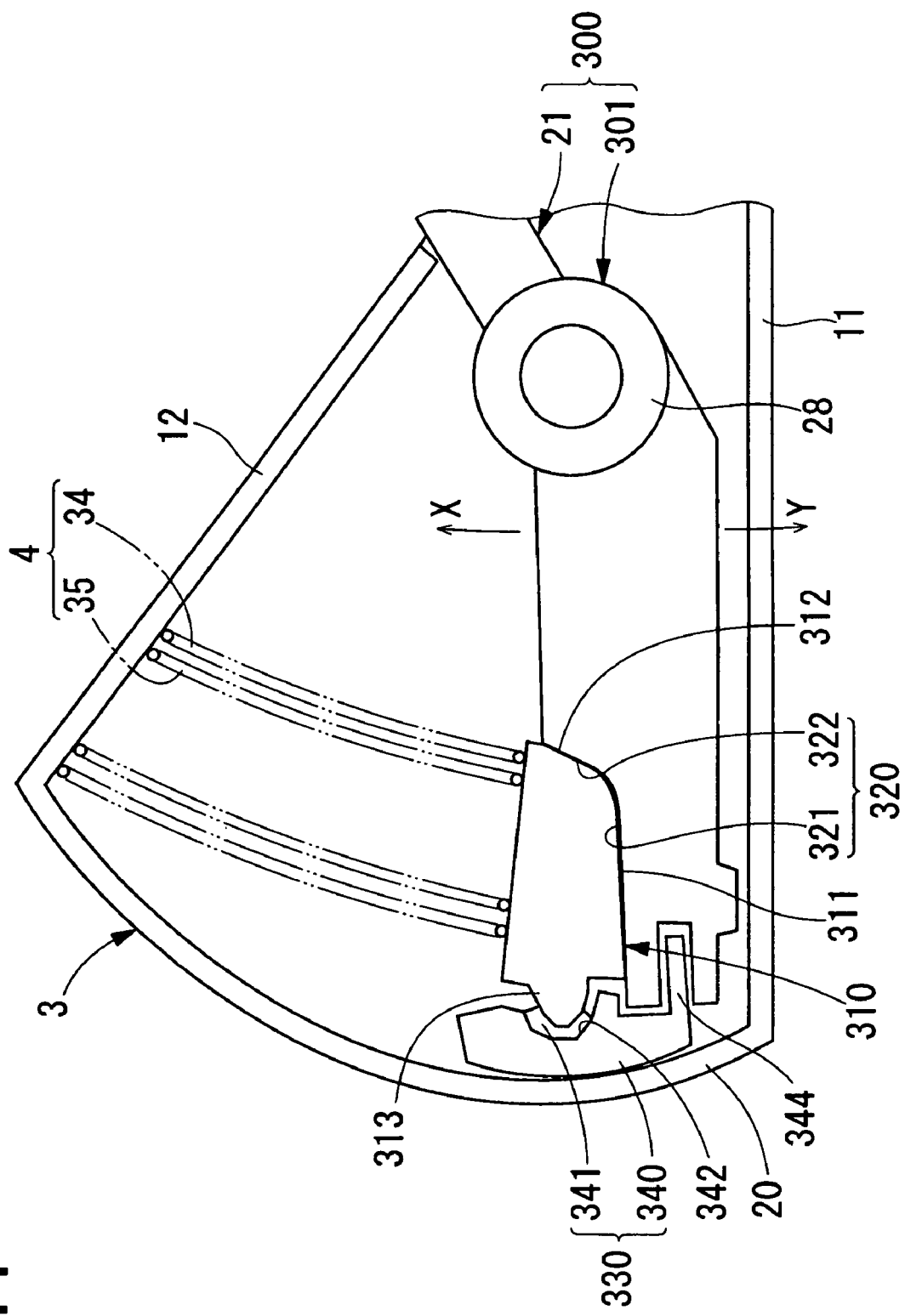

PEDAL MODULE

CROSS REFERENCE TO RELATED APPLICATION

This application is based on and incorporates herein by reference Japanese Patent Application No. 2006-32712 filed on Feb. 9, 2006.

BACKGROUND OF THE INVENTION

1. Field of the Invention

The present invention relates to a pedal module.

2. Description of Related Art

For instance, a pedal module, which is used in a vehicle accelerator apparatus, is rotated in a forward rotational direction by a pedal force applied from an operator, i.e., a driver to a pedal of the pedal module and is rotated in a reverse rotational direction by a restoring force of, for example, a spring. One of such a pedal module has a friction member, which generates friction between the pedal and the friction member to apply a frictional force to the pedal, so that the pedal module generates a hysteresis, as shown in FIG. 22, which indicates a relationship between a rotational position of the pedal and a required pedal force (see Japanese Unexamined Patent Publication No. 2004-90755).

However, according to the prior art technique disclosed in Japanese Unexamined Patent Publication No. 2004-90755, as shown in FIG. 22, a sharp characteristic change point "b" appears between a steep initial rising range "a" and a steady range "c" in the pedal characteristics at the time of performing the pedal pressing operation. Thus, the operator may often apply an excessive initial pedal force, which far exceeds a required minimum pedal force, at the time of pressing the pedal, which is held in an initial position, in the forward rotational direction. In such a case, the pedal may be erroneously rotated to an unintended position, and thereby the operator may be annoyed. Furthermore, particularly, in the case of the pedal module used in the vehicle accelerator apparatus, at the time of starting a vehicle by pressing the pedal of the accelerator apparatus held in the initial position, the vehicle may make an uncomfortable jackrabbit start, and thereby the operator may have an uncomfortable feeling. This will deteriorate the drivability of the vehicle.

SUMMARY

The present exemplary embodiment addresses the above disadvantage. Thus, it is an objective of the present exemplary embodiment to provide a pedal module, which implements an improved operational feeling of a pedal.

To achieve the objective of the exemplary embodiment, there is provided a pedal module, which includes a restoring force exerting means, a pedal, a supporting body and a friction means. The restoring force exerting means is for exerting a restoring force. The pedal is rotated in a forward rotational direction by a pedal force and is rotated in a reverse rotational direction by the restoring force. The supporting body supports the pedal. The friction means is for generating friction between the pedal and the friction means. The friction means includes a sliding part, a holding part and a resiliently deformable part. The sliding part slidably engages the pedal. The holding part is held by the supporting body. The resiliently deformable part is resiliently deformable between the sliding part and the holding part to permit displacement of the sliding part relative to the holding part.

To achieve the objective of the exemplary embodiment, there is also provided a pedal module, which includes a restoring force exerting means, a pedal, a supporting body and a friction means. The restoring force exerting means is for exerting a restoring force. The pedal is rotated in a forward rotational direction by a pedal force and is rotated in a reverse rotational direction by the restoring force. The supporting body supports the pedal. The friction means is for generating friction between the pedal and the friction means. The friction means includes a sliding part and a resiliently deformable part. The sliding part slidably engages the pedal. The resiliently deformable part is held by the supporting body and is resiliently deformable between the supporting body and the sliding part to permit displacement of the sliding part relative to the supporting body.

To achieve the objective of the exemplary embodiment, there is also provided a pedal module, which includes a restoring force exerting means, a pedal, a supporting body and a friction means. The restoring force exerting means is for exerting a restoring force. The pedal is rotated in a forward rotational direction by a pedal force and is rotated in a reverse rotational direction by the restoring force. The supporting body supports the pedal. The friction means is for generating friction between the supporting body and the friction means. The friction means is rotated together with the pedal and includes a sliding part, a holding part and a resiliently deformable part. The sliding part slidably engages the supporting body. The holding part is held by the pedal. The resiliently deformable part is resiliently deformable between the sliding part and the holding part to permit displacement of the holding part relative to the sliding part.

To achieve the objective of the exemplary embodiment, there is also provided a pedal module, which includes a restoring force exerting means, a pedal, a supporting body and a friction means. The restoring force exerting means is for exerting a restoring force. The pedal is rotated in a forward rotational direction by a pedal force and is rotated in a reverse rotational direction by the restoring force. The supporting body supports the pedal. The friction means is for generating friction between the supporting body and the friction means. The friction means is rotated together with the pedal and includes a sliding part and a resiliently deformable part. The sliding part slidably engages the supporting body. The resiliently deformable part is held by the pedal and is resiliently deformable between the pedal and the sliding part to permit displacement of the pedal relative to the sliding part.

To achieve the objective of the exemplary embodiment, there is further provided a pedal module, which includes a restoring force exerting means, a pedal, a supporting body and a friction member. The restoring force exerting means is for exerting a restoring force. The pedal is rotated in a forward rotational direction by a pedal force and is rotated in a reverse rotational direction by the restoring force. The supporting body supports the pedal. The friction member is rotated together with the pedal and generates friction between the supporting body and the friction member. The pedal includes a rotatable part and a conducting means. The rotatable part is supported by the supporting body and is rotated by the pedal force and the restoring force. The conducting means is for conducting the pedal force and the restoring force from the rotatable part to the friction member. The conducting means includes an engaging part, a holding part and a resiliently deformable part. The engaging part engages the friction member. The holding part is held by the rotatable part. The resiliently deformable part is resiliently deformable between the engaging part and the holding part to permit displacement of the holding part relative to the engaging part.

The exemplary embodiment, together with additional objectives, features and advantages thereof, will be best understood from the following description, the appended claims and the accompanying drawings in which FIG. 1 is a cross-sectional view taken along line I-I in FIG. 6 showing a main feature of a first embodiment of the present invention;

FIG. 14 is a schematic diagram showing a structure of a sixth embodiment of the present invention;

DETAILED DESCRIPTION OF EXEMPLARY EMBODIMENTS

Various embodiments of the present invention will be described with reference to the accompanying drawings. In the following embodiments, similar components are indicated by the same numerals and will be described only once to avoid redundancy.

First Embodiment

Figure 4:
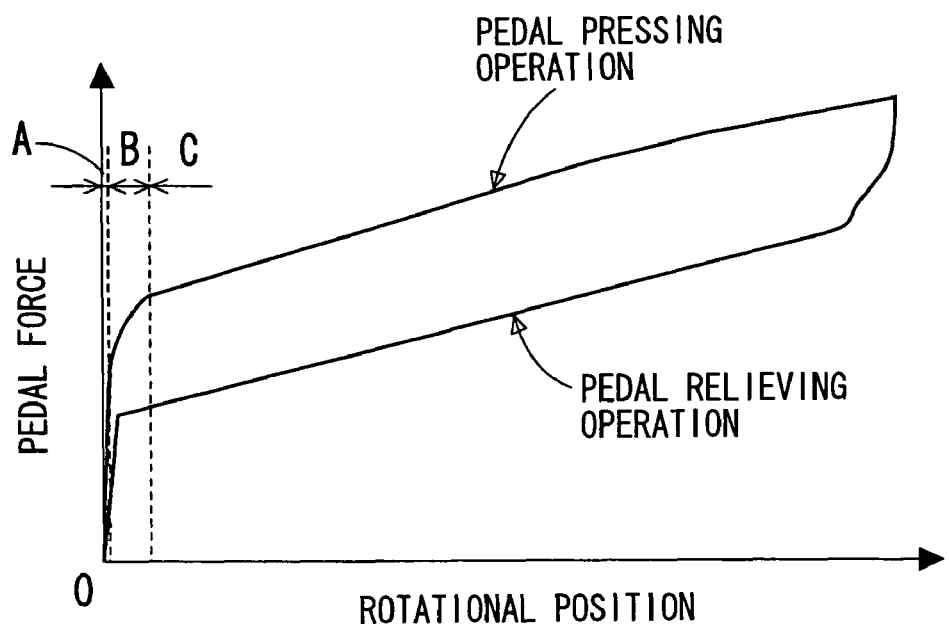
FIG. 4 is a schematic diagram showing characteristics of the first embodiment.
Figure 2:
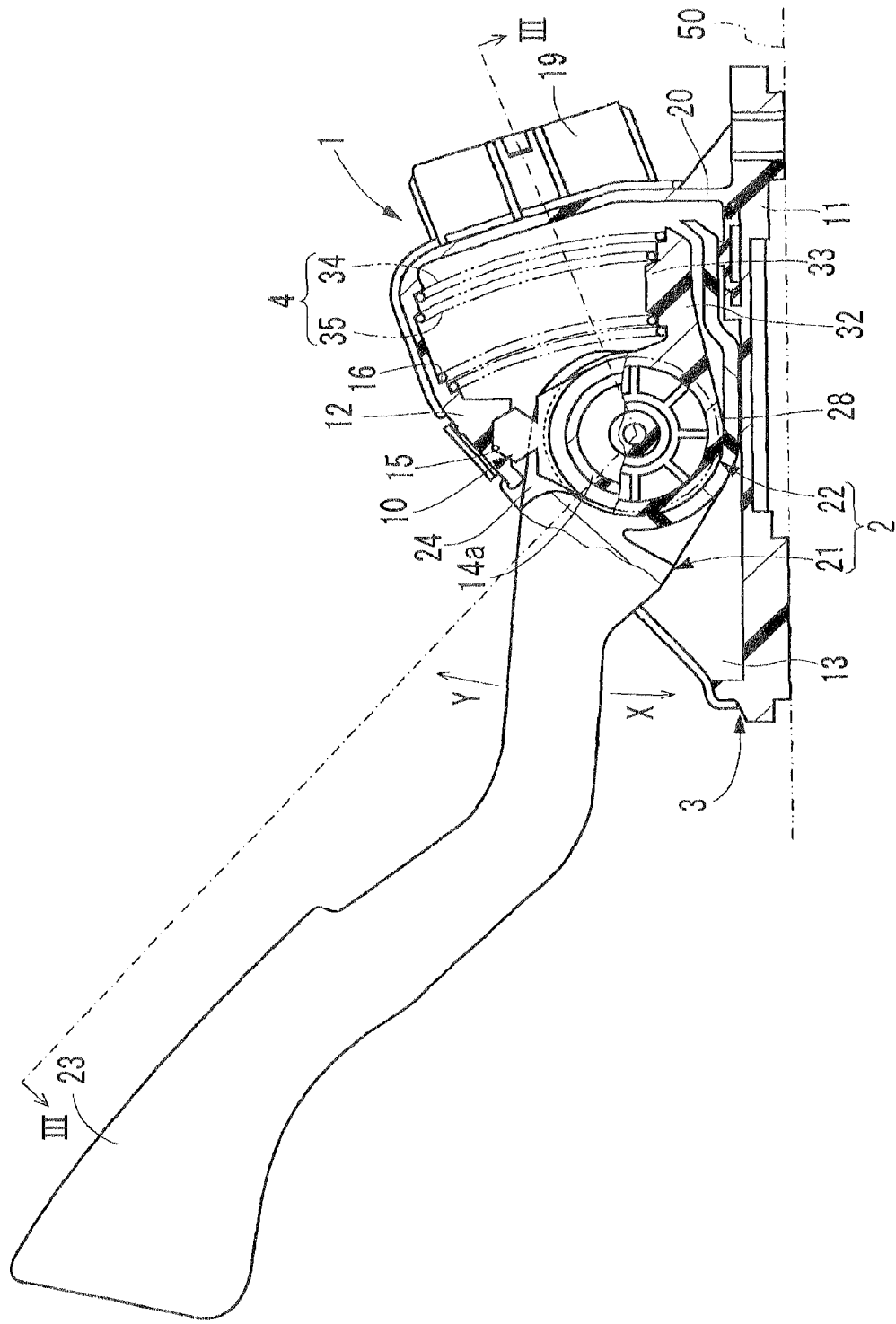
FIG. 2 is a cross-sectional view taken along line II-II in FIG. 3 showing a structure of the first embodiment.
Figure 3:
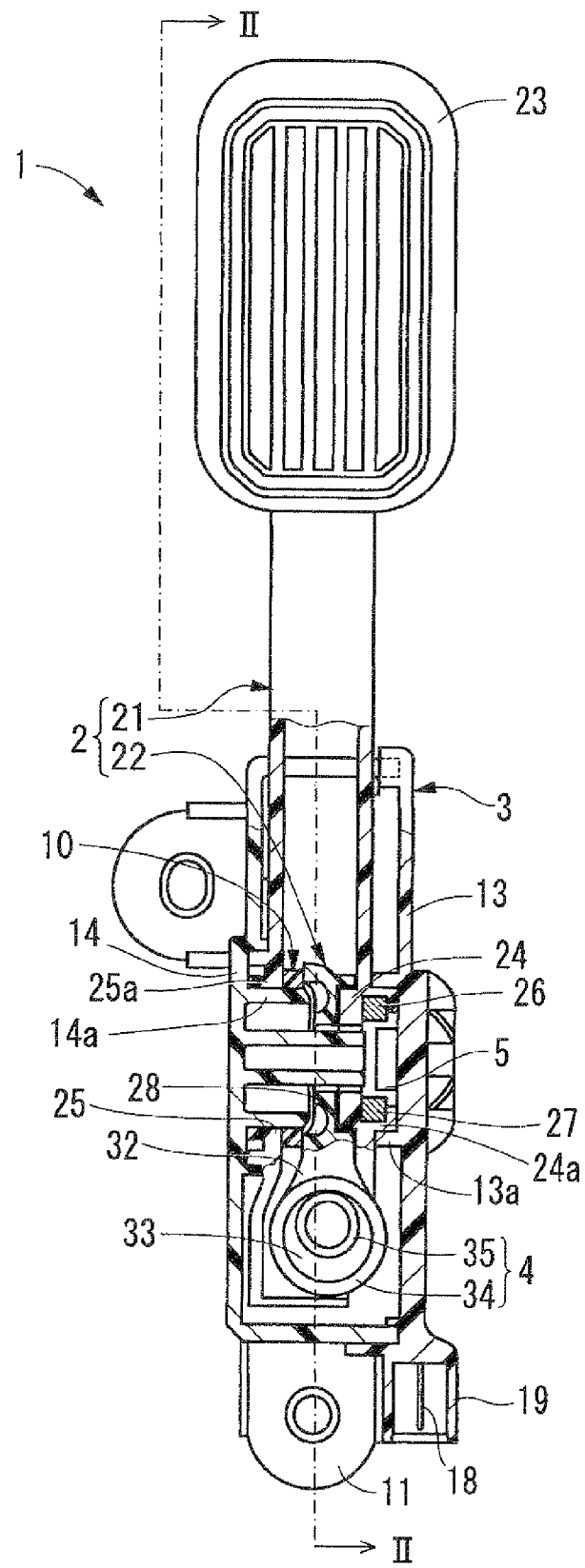
FIG. 3 is a cross-sectional view taken along line III-III in FIG. 2 showing the structure of the first embodiment.

FIGS. 2 and 3 show a vehicle accelerator apparatus 1, which serves as a pedal module according to a first embodiment of the present invention. In the accelerator apparatus 1, an accelerator pedal 2 is supported by a housing 3 in a rotatable manner in both of a forward rotational direction and a reverse rotational direction. Specifically, the accelerator pedal 2 is rotated in the forward rotational direction by a pedal pressure applied from a driver and is rotated in the reverse rotational direction by a restoring force of a double coil spring arrangement 4. In the accelerator apparatus 1, a friction member 10 is provided to generate friction between the friction member 10 and the accelerator pedal 2. As shown in FIG. 4, a hysteresis is observed in pedal characteristics, which indicate a relationship between a rotational position of the accelerator pedal 2 and the required pedal force that needs to be applied from the driver. Furthermore, the accelerator apparatus 1 is of an accelerator-by-wire type. The rotational position of the accelerator pedal 2 is sensed with a rotational position sensor 5 shown in FIG. 3, and the measurement of the rotational position sensor 5 is supplied to a control apparatus of the vehicle.

The structure of the accelerator apparatus 1 will now be described further in detail.

As shown in FIGS. 2 and 3, the housing 3 is molded from a resin material into a hollow body and includes a bottom plate 11, a top plate 12, lateral plates 13, 14 and a projecting plate 20.

The bottom plate 11 is fixed to a vehicle body 50 with, for example, bolts. A fitting hole 15 and a locking hole 16 are formed in an inner wall of the top plate 12, which is opposed to the bottom plate 11. The lateral plates 13, 14 are opposed to each other in a direction parallel to a rotational axis of the accelerator pedal 2 in such a manner that the accelerator pedal 2 is placed between the lateral plates 13, 14. The bottom plate 11 and the top plate 12 connect between the lateral plates 13, 14. A bearing portion 13a is formed integrally with an inner wall of the lateral plate 13, and the rotational position sensor 5 is held at a location radially inward of the bearing portion 13a. A connector 19 is formed in an outer wall of the lateral plate 13 in such a manner that terminals 18, which are electrically connected to the rotational position sensor 5, are insert molded in the connector 19. A bearing portion 14a is formed integrally in an inner wall of the other lateral plate 14. The projecting plate 20 additionally connects between the bottom plate 11 and the top plate 12.

Figure 5:
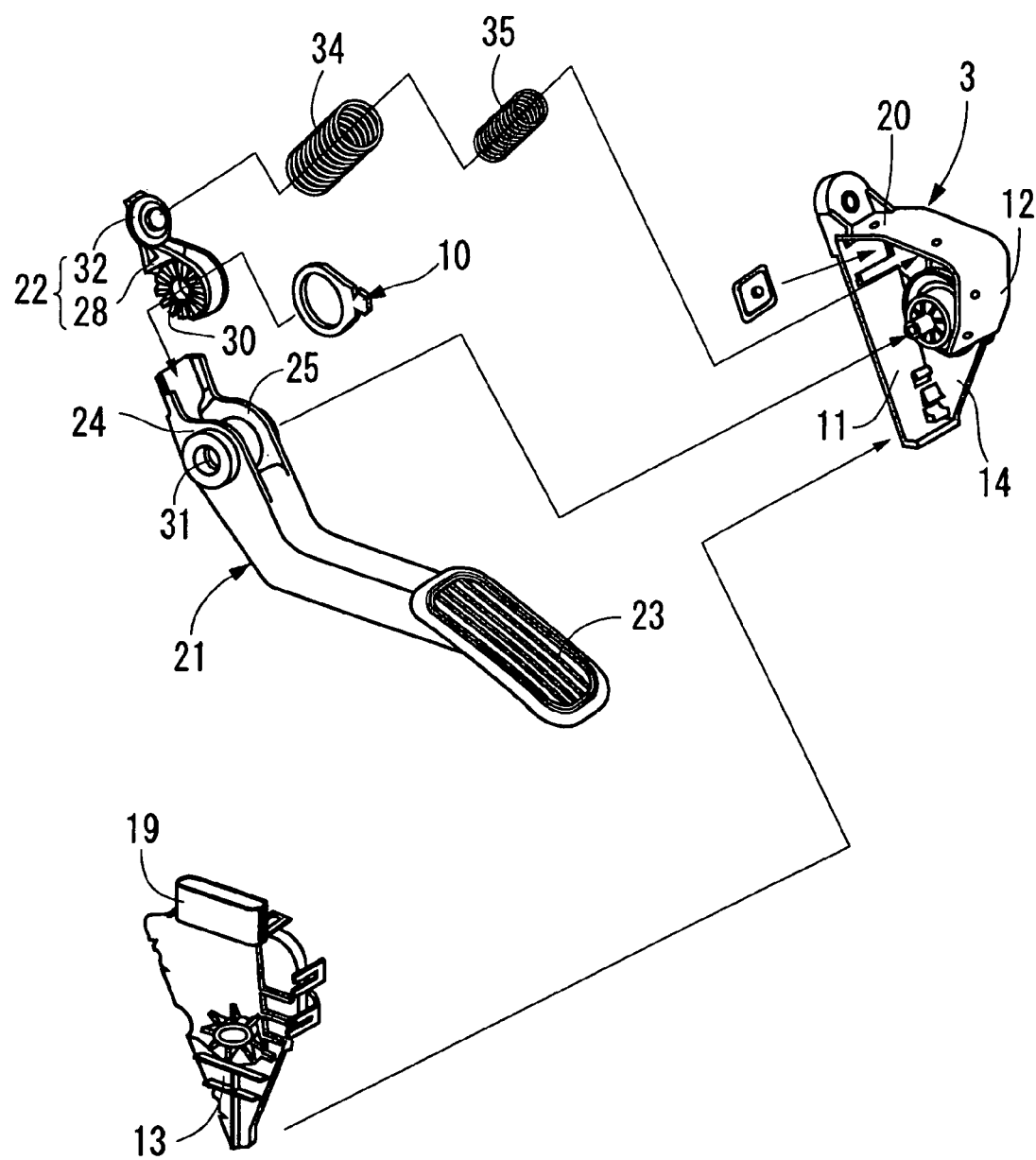
FIG. 5 is an exploded perspective view showing the structure of the first embodiment.

As shown in FIGS. 2, 3 and 5, the accelerator pedal 2 includes a pedal arm 21 and a spring rotor 22.

Figure 7:
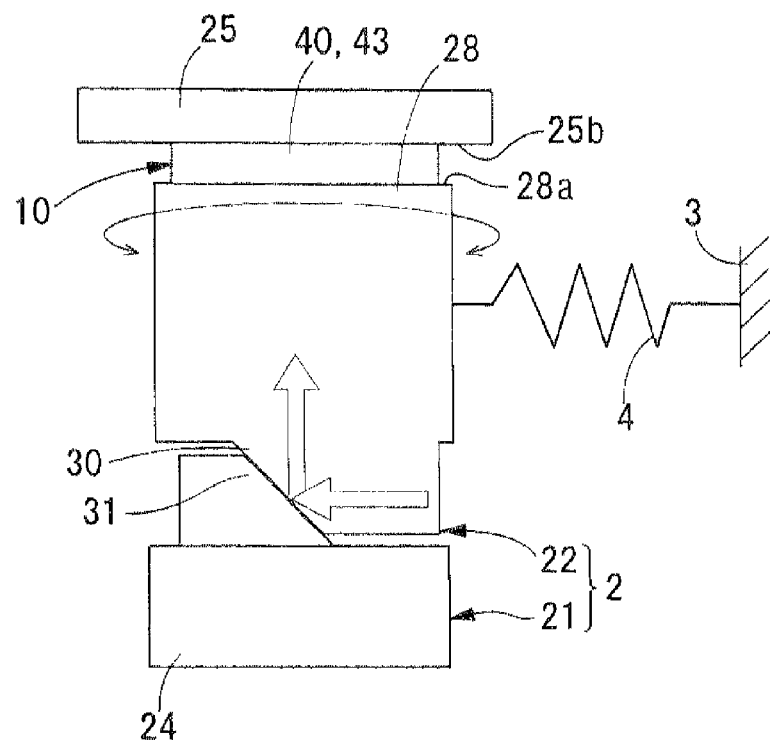
FIG. 7 is a schematic diagram showing an operation of the first embodiment.

The pedal arm 21 is made of a resin material and is formed into an obtuse-angled V-shaped body. A manipulating portion 23, which is depressed by a foot of the operator, is formed at an exposed end of the pedal arm 21, which is exposed from the housing 3. The manipulating portion 23 receives a press force from the operator in the forward rotational direction of the accelerator pedal 2, which is indicated by an arrow X in FIG. 2. A bent portion of the pedal arm 21, which is received in the housing 3, includes two lateral wall sections 24, 25, which are opposed to each other in a direction parallel to the rotational axis to receive the spring rotor 22 therebetween. A shaft portion 24a and a shaft portion 25a are formed in an inner wall of the lateral wall section 24, which is on the lateral plate 13 side, and an inner wall of the lateral wall section 25, which is on the lateral plate 14 side, respectively. A surface 25b (of portion 25a of lateral wall section 25) slidingly engages with friction member 10 as shown in FIG. 7. The shaft portion 24a and the shaft portion 25a are rotatably supported by the bearing portion 13a of the lateral plate 13 and the bearing portion 14a of the lateral plate 14. Two magnets 26, 27 are embedded in the shaft portion 24a. The rotational position sensor 5 senses the rotational position of the pedal arm 21 in view of the direction of the magnetic field that is formed by the magnets 26, 27.

Figure 6:
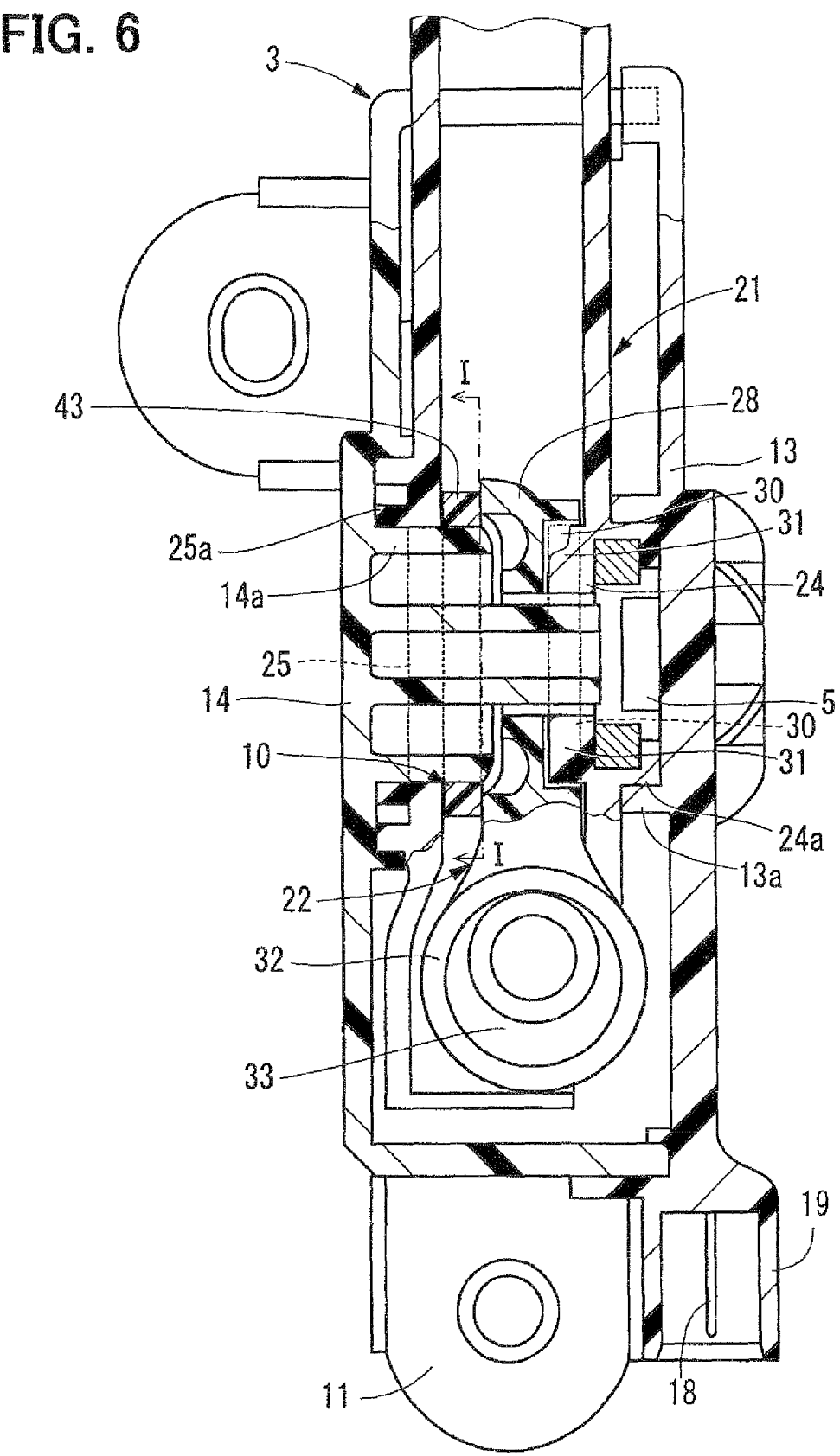
FIG. 6 is a partially enlarged view of FIG. 3.

The spring rotor 22 is made of, for example, resin and is positioned between the lateral wall sections 24, 25 in the housing 3. The spring rotor 22 includes an annular plate shaped rotor main body 28, which is coaxial with the shaft portions 24a, 25a of the pedal arm 21. As shown in FIGS. 5 and 6, a plurality of bevel gear teeth 30 is formed in the rotor main body 28 on the lateral wall section 24 side. The bevel gear teeth 30 are arranged one after another at generally equal intervals in the rotational direction of the accelerator pedal 2. Furthermore, a plurality of bevel gear teeth 31 is formed in the lateral wall section 24 on the rotor main body 28 side. The bevel gear teeth 31 are arranged one after another at generally equal intervals in the rotational direction of the accelerator pedal 2 to mesh with the bevel gear teeth 30 of the rotor main body 28. Through this engagement between the gear teeth 31 and the gear teeth 30, the pedal arm 21 and the spring rotor 22 can rotate integrally.

As shown in FIGS. 2, 3 and 5, the spring rotor 22 further includes a spring receiver 32. The spring receiver 32 is formed as a plate shaped body, which projects from an outer peripheral surface of the rotor main body 28 in a tangential direction and is opposed to the manipulating portion 23 in such a manner that the shaft portions 24a, 25a are positioned between the spring receiver 32 and the manipulating portion 23. The spring receiver 32 includes a locking protrusion 33, which protrudes toward the top plate 12 side.

The double coil spring arrangement 4 includes an outer coil 34 and an inner coil 35. Each coil 34, 35 is made as a compression coil spring. One end of each coil 34, 35 is securely fitted into the locking hole 16 of the top plate 12, and the other end of each coil 34, 35 is securely fitted to the locking protrusion 33 of the spring receiver 32. In this way, the spring receiver 32 receives a summed force, i.e., a resultant (hereinafter, simply referred to as the restoring force of the double coil spring arrangement 4) of the restoring force of the coil 34 and the restoring force of the coil 35 in the reverse rotational direction of the accelerator pedal 2, which is indicated by an arrow Y in FIG. 2.

Figure 1:
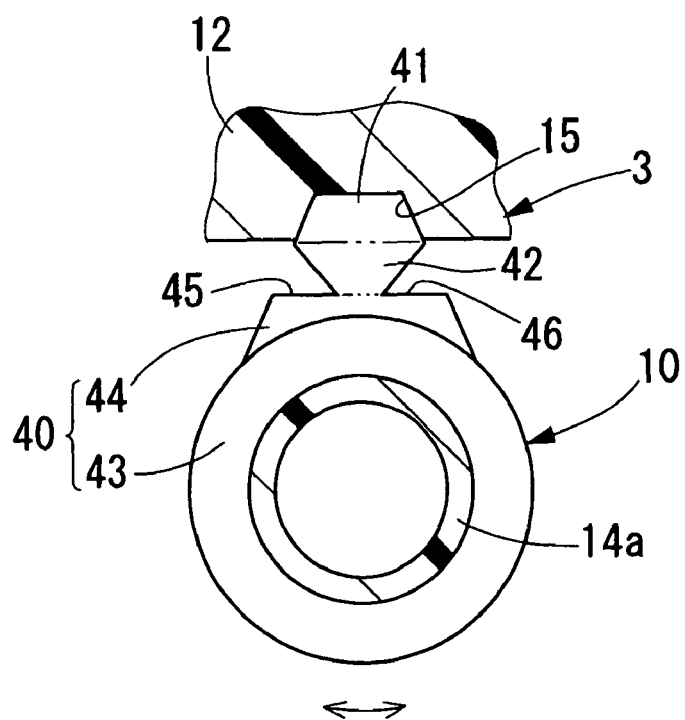

As shown in FIGS. 2 and 6, the friction member 10 is made of, for example, resin and is shaped into the generally flat plate form. The friction member 10 is positioned in such a manner that a plate thickness direction of the friction member 10 generally coincides with the direction of the rotational axis of the accelerator pedal 2. As shown in FIGS. 1 and 6, the friction member 10 includes a sliding part 40, a holding part 41 and a resiliently deformable part 42. In FIG. 1, each of a boundary between the sliding part 40 and the resiliently deformable part 42 and a boundary between the holding part 41 and the resiliently deformable part 42 is indicated by a corresponding dot-dot-dash line. The sliding part 40 engages the rotor main body 28 on the lateral wall section 25 side and includes a slidable main body 43 and a projection 44. The slidable main body 43 is shaped into a hollow cylindrical body and is rotatably supported by the bearing portion 14a of the lateral plate 14. The projection 44 projects radially outward from the slidable main body 43. The holding part 41 is fitted into the fitting hole 15 of the top plate 12, so that the holding part 41 is non-displaceably held by the housing 3 in the rotational direction (both the forward rotational direction and the reverse rotational direction) of the accelerator pedal 2. The resiliently deformable part 42 connects between the projection 44 and the holding part 41. Two recesses 45, 46 are formed on the opposed sides of the resiliently deformable part 42, which are opposed to each other in the rotational direction of the accelerator pedal 2. A circumferential width of the resiliently deformable part 42, which is measured in the rotational direction of the accelerator pedal 2, is set to be smaller than that of the projection 44 and that of the holding part 41. In this way, the resiliently deformable part 42 can resiliently deform between the projection 44 and the holding part 41. When the resiliently deformable part 42 is resiliently deformed, the sliding part 40 is displaced relative to the holding part 41 in the rotational direction of the accelerator pedal 2.

Next, operation of the accelerator apparatus 1 will be described.

When the operator does not operate the accelerator pedal 2, the accelerator pedal 2 receives the restoring force of the double coil spring arrangement 4 and thereby is locked by the top plate 12, so that the accelerator pedal 2 is placed in an initial position shown in FIG. 2.

At the time of starting the vehicle, when the operator performs the pedal pressing operation to press the accelerator pedal 2 held in the initial position and thereby to increase the pedal force applied against the manipulating portion 23, the sliding part 40 of the friction member 10 slides over the rotor main body 28 of the spring rotor 22. Thus, friction is generated between these components 40, 28, and thereby the sliding part 40 is dragged in the rotational direction of the accelerator pedal 2. At this time, the resiliently deformable part 42 is resiliently deformed between the sliding part 40 and the holding part 41, which is held by the housing 3, so that the sliding part 40 is displaced relative to the holding part 41. Thus, the sliding part 40 is displaced together with the accelerator pedal 2 in the rotational direction of the accelerator pedal 2. Therefore, the operator can move the accelerator pedal 2 from the initial position with a smaller pedal force, which is smaller than a resultant of the restoring force of the double coil spring arrangement 4 and the frictional force between the sliding part 40 and the rotor main body 28. As a result, as shown in FIG. 4, the pedal characteristics at the time of performing the pedal pressing operation have a moderate shift range B, which exits after a steep initial rising range A. In the moderate shift range B, a change in the required pedal force becomes smaller with respect to a change in the rotational position of the accelerator pedal 2. In this way, it is possible to limit the unintentional operation of the accelerator pedal 2, which would occur when the operator applies a relatively large initial pedal force, which is larger than a required minimum pedal force. Therefore, the operational feeling of the accelerator pedal 2 is improved. As a result, the drivability of the vehicle at the time of starting the vehicle can be improved.

Furthermore, the pedal characteristics in the pedal pressing operation also have a steady range C of FIG. 4. In the steady range C, when the pedal force, which is applied to the manipulating portion 23, is increased to rotate the accelerator pedal 2 in the forward rotational direction, the restoring force of the double coil spring arrangement 4 is increased. In this way, as shown in FIG. 7, the bevel gear teeth 30 of the spring rotor 22, which receives the restoring force of the double coil spring arrangement 4, are urged against the bevel gear teeth 31 of the pedal arm 21. Therefore, a resultant reaction force, which is generated upon the urging of the bevel gear teeth 30 against the bevel gear teeth 31, urges the surface 28a of rotor main body 28 of the spring rotor 22 against the sliding part 40 of the friction member 10, as shown in FIG. 7. Therefore, when the accelerator pedal 2 is rotated in the forward rotational direction, the frictional force, which is generated between the sliding part 40 and the rotor main body 28 in the reverse rotational direction of the accelerator pedal 2, is increased. As a result, the required pedal force is increased in response to the increase in the restoring force of the double coil spring arrangement 4 (see FIG. 4).

Furthermore, when the operator performs the pedal relieving operation to reduce the pedal force applied to the manipulating portion 23 of the accelerator pedal 2 at a location that is spaced from the initial position in the forward rotational direction of the accelerator pedal 2, the restoring force of the double coil spring arrangement 4 is reduced. In this way, the urging force, which urges the bevel gear teeth 30 of the spring rotor 22 against the bevel gear teeth 31 of the pedal arm 21, is reduced, and thereby the urging force, which urges the rotor main body 28 of the spring rotor 22 against the sliding part 40 of the friction member 10, is reduced. Therefore, when the accelerator pedal 2 is rotated in the reverse rotational direction, the frictional force, which is generated between the sliding part 40 and the rotor main body 28 in the forward rotational direction of the accelerator pedal 2, is decreased. As a result, the required pedal force is reduced in response to the decrease in the restoring force of the double coil spring arrangement 4 (see FIG. 4). Therefore, the hysteresis appears between the pedal characteristics at the time of performing the pedal relieving operation and the pedal characteristics at the time of performing the pedal pressing operation.

In the first embodiment, the double coil spring arrangement 4 corresponds to a restoring force applying means of the invention, and the accelerator pedal 2 corresponds to a pedal of the invention. Furthermore, the housing 3 corresponds to a supporting body of the invention, and the friction member 10 corresponds to a friction means.

Second Embodiment

Figure 8:
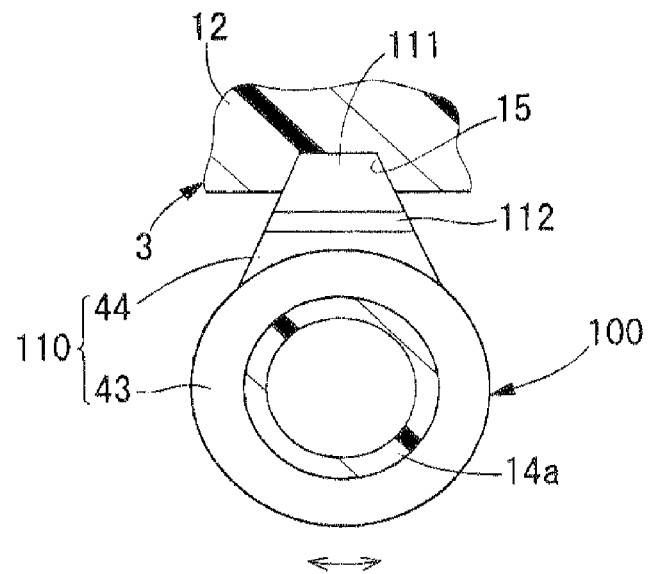
FIG. 8 is a cross-sectional view similar to FIG. 1 showing a main feature of a second embodiment of the present invention.

As shown in FIG. 8, a second embodiment of the present invention is a modification of the first embodiment.

In the second embodiment, a friction body 100 is provided in place of the friction member 10. Specifically, the friction body 100 is shaped into a plate body, into which two rigid members (i.e., first and second rigid members) 110, 111 and one resilient member 112 are integrated. A plate thickness direction of the friction body 100 generally coincides with the direction of the rotational axis of the accelerator pedal 2. The first rigid member 110 is made of, for example, resin and has substantially the same structure as that of the sliding part 40 of the first embodiment. Furthermore, the second rigid member 111 is made of, for example, resin and has substantially the same structure as that of the holding part 41 of the first embodiment. Furthermore, the resilient member 112 is held between the first rigid member 110 and the second rigid member 111 and is made of, for example, rubber that has a rigidity lower than that of the first and second rigid members 110, 111. Therefore, when the resilient member 112 is resiliently deformed, the first rigid member 110 is displaced relative to the second rigid member 111 in the rotational direction of the accelerator pedal 2. A width of an inner radial end of the resilient member 112, which is measured in a direction (a left-to-right direction in FIG. 8) generally parallel to the rotational direction of the accelerator pedal 2, is substantially the same as a width of an outer radial end of the first rigid member 110, which is measured in the direction generally parallel to the rotational direction of the accelerator pedal 2. Also, a width of an outer radial end of the resilient member 112, which is measured in the direction generally parallel to the rotational direction of the accelerator pedal 2, is substantially the same as a width of an inner radial end of the second rigid member 111, which is measured in the direction generally parallel to the rotational direction of the accelerator pedal 2.

According to the second embodiment, when the pedal pressing operation is performed on the accelerator pedal 2, which is placed in the initial position, the first rigid member 110 of the friction body 100 slides over the rotor main body 28 of the spring rotor 22. Thus, friction is generated between the first rigid member 110 and the rotor main body 28, and thereby the first rigid member 110 is dragged in the rotational direction of the accelerator pedal 2. At this time, the resilient member 112 of the friction body 100 is resiliently deformed between the first rigid member 110 and the second rigid member 111, which is held by the housing 3, so that the first rigid member 110 is displaced relative to the second rigid member 111. Thus, the first rigid member 110 is displaced together with the accelerator pedal 2 in the rotational direction of the accelerator pedal 2. Therefore, the operator can move the accelerator pedal 2 from the initial position with a smaller pedal force, which is smaller than the resultant of the restoring force of the double coil spring arrangement 4 and the frictional force between the first rigid member 110 and the rotor main body 28. As a result, the operational feeling of the accelerator pedal 2 is improved according to the principal, which is similar to that of the first embodiment, so that the drivability is improved at the time of starting the vehicle.

According to the second embodiment, the friction body 100 corresponds to the friction means of the invention, and the first rigid member 110 corresponds to the sliding part of the invention. Furthermore, the second rigid member 111 corresponds to the holding part of the invention, and the resilient member 112 corresponds to the resiliently deformable part of the invention.

Third Embodiment

Figure 9:
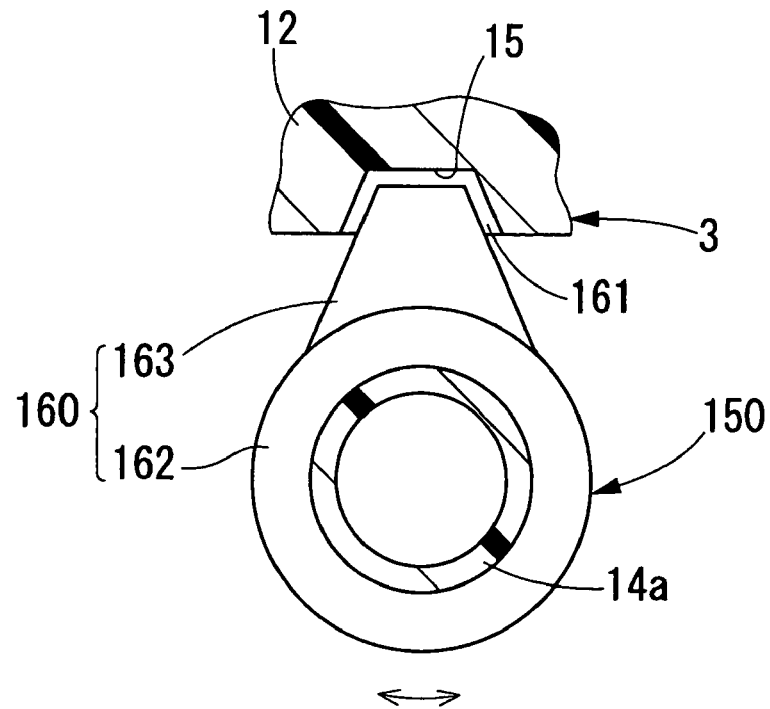
FIG. 9 is a cross-sectional view similar to FIG. 1 showing a main feature of a third embodiment of the present invention.

As shown in FIG. 9, a third embodiment of the present invention is a modification of the first embodiment.

In the third embodiment, a friction body (friction member) 150 is provided in place of the friction member 10. Specifically, the friction body 150 is shaped into a plate body, into which one rigid member 160 and one resilient member 161 are integrated. A plate thickness direction of the friction body 150 generally coincides with the direction of the rotational axis of the accelerator pedal 2. The rigid member 160 is made of, for example, resin and includes a slidable main body 162 and a projection 163. A structure of the slidable main body 162 is substantially the same as that of the slidable main body 43 of the first embodiment. Furthermore, the projection 163 is formed to project radially outward from the slidable main body 162 in an amount that is greater than that of the projection 44 of the first embodiment. The resilient member 161 is made of, for example, rubber, which has a rigidity that is lower than the rigidity of the rigid member 160 and the rigidity of the top plate 12. Furthermore, the resilient member 161 is shaped into a generally U-shaped body, which receives a radially outer end of the projection 163. The resilient member 161 is fitted into the fitting hole 15 of the top plate 12, so that the resilient member 161 is held between the housing 3 and the rigid member 160 in such a manner that the resilient member 161 is non-displaceably held by the housing 3 in the rotational direction of the accelerator pedal 2. Therefore, when the resilient member 161 is resiliently deformed, the rigid member 160 is displaced relative to the housing 3 in the rotational direction of the accelerator pedal 2.

According to the third embodiment, when the pedal pressing operation is performed on the accelerator pedal 2, which is placed in the initial position, the rigid member 160 of the friction body 150 slides over the rotor main body 28 of the spring rotor 22. Thus, friction is generated between the rigid member 160 and the rotor main body 28, and thereby the rigid member 160 is dragged in the rotational direction of the accelerator pedal 2. At this time, the resilient member 161 of the friction body 150 is resiliently deformed between the rigid member 160 and the housing 3, so that the rigid member 160 is displaced relative to the housing 3. Thus, the rigid member 160 is displaced together with the accelerator pedal 2 in the rotational direction of the accelerator pedal 2. Therefore, the operator can move the accelerator pedal 2 from the initial position with a smaller pedal force, which is smaller than the resultant of the restoring force of the double coil spring arrangement 4 and the frictional force between the rigid member 160 and the rotor main body 28. As a result, the operational feeling of the accelerator pedal 2 is improved according to the principal, which is similar to that of the first embodiment, so that the drivability is improved at the time of starting the vehicle.

In the third embodiment, it is not absolutely necessary to integrate the rigid member 160 and the resilient member 161 together. In a case where the rigid member 160 and the resilient member 161 are not integrated together, the resilient member 161 may be integrated with the fitting hole 15 of the top plate 12.

According to the third embodiment, the friction body 150 corresponds to the friction means of the invention, and the rigid member 160 corresponds to the sliding part of the invention. Furthermore, the resilient member 161 corresponds to the resiliently deformable part of the invention.

Fourth Embodiment

Figure 10:
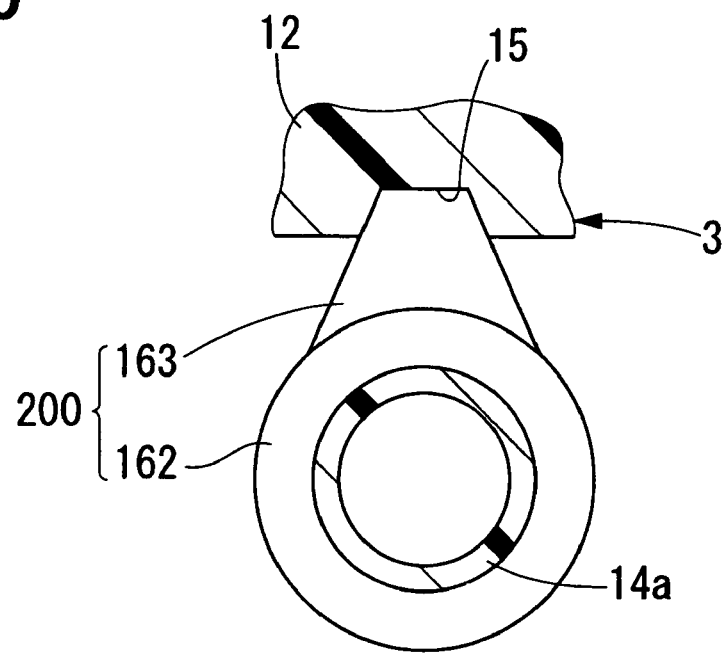
FIG. 10 is a cross-sectional view similar to FIG. 1 showing a main feature of a fourth embodiment of the present invention.
Figure 11:
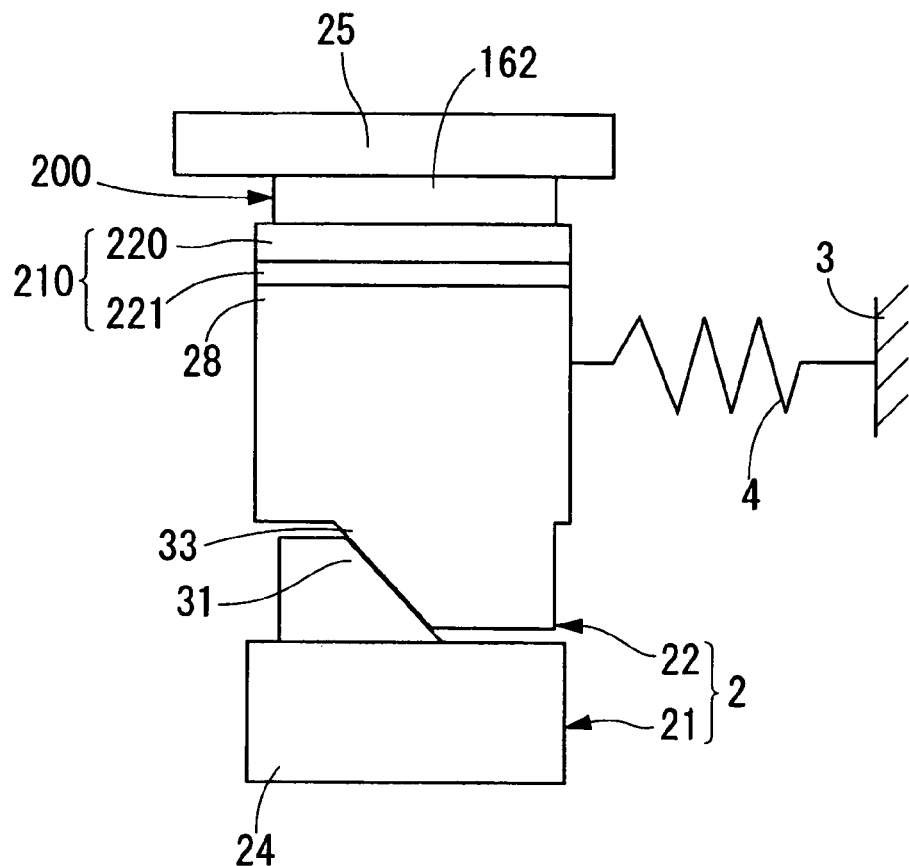
FIG. 11 is a schematic diagram showing a structure of the fourth embodiment.

As shown in FIGS. 10, 11, a fourth embodiment of the present invention is a modification of the third embodiment.

In the fourth embodiment, as shown in FIG. 10, a friction member 200 is provided in place of the friction body 150. The friction member 200 has the same structure as that of the friction body 150 except the resilient member 161, which is not preset in the friction member 200. Specifically, in the friction member 200, the projection 163 is directly fitted into the fitting hole 15 of the top plate 12, and the rest of the friction member 200 is substantially the same as that of the rigid member 160. Therefore, it is possible to consider that the friction member 200 is integrated with the housing 3.

Furthermore, in the fourth embodiment shown in FIG. 11, a friction body 210 is additionally provided and is rotated integrally with the spring rotor 22. Specifically, the friction body 210 is a hollow cylindrical body, into which one rigid member 220 and one resilient member 221 are integrated together. Furthermore, the friction body 210 is coaxial with the rotor main body 28 of the spring rotor 22 and the slidable main body 162 of the friction member 200. The rigid member 220 is made of, for example, resin and is engaged with the slidable main body 162. The resilient member 221 is made of, for example, rubber, which has a rigidity that is smaller than a rigidity of the rigid member 220 and a rigidity of the rotor main body 28. Furthermore, the resilient member 221 is connected to the rotor main body 28 on the lateral wall section 25 side of the rotor main body 28 and is supported by the spring rotor 22. Thus, when the resilient member 221, which is held between the rigid member 220 and the spring rotor 22, is resiliently deformed, the rigid member 220 is displaced relative to the spring rotor 22 in the rotational direction of the accelerator pedal 2.

According to the fourth embodiment, when the pedal pressing operation is performed on the accelerator pedal 2, which is placed in the initial position, the rigid member 220 of the friction body 210 slides over the friction member 200. Thus, friction is generated between the rigid member 220 and the friction member 200, and thereby displacement of the rigid member 220 in the rotational direction of the accelerator pedal 2 is limited. At this time, in the friction body 210, the resilient member 221 is resiliently deformed between the rigid member 220 and the rotor main body 28, so that the spring rotor 22 is displaced relative to the rigid member 220. Thus, the spring rotor 22 and the pedal arm 21 are rotated together in the forward rotational direction. Therefore, the operator can move the accelerator pedal 2 from the initial position with a smaller pedal force, which is smaller than the resultant of the restoring force of the double coil spring arrangement 4 and the frictional force between the rigid member 220 and the friction member 200. As a result, the operational feeling of the accelerator pedal 2 is improved according to the principal, which is similar to that of the first embodiment, so that the drivability is improved at the time of starting the vehicle.

According to the fourth embodiment, the housing 3 and the friction member 200 cooperate together to serve as supporting body of the invention, and the friction body 210 corresponds to the friction means of the invention. Furthermore, the rigid member 220 corresponds to the sliding part of the invention. The resilient member 221 corresponds to the resiliently deformable part of the invention.

Fifth Embodiment

Figure 12:
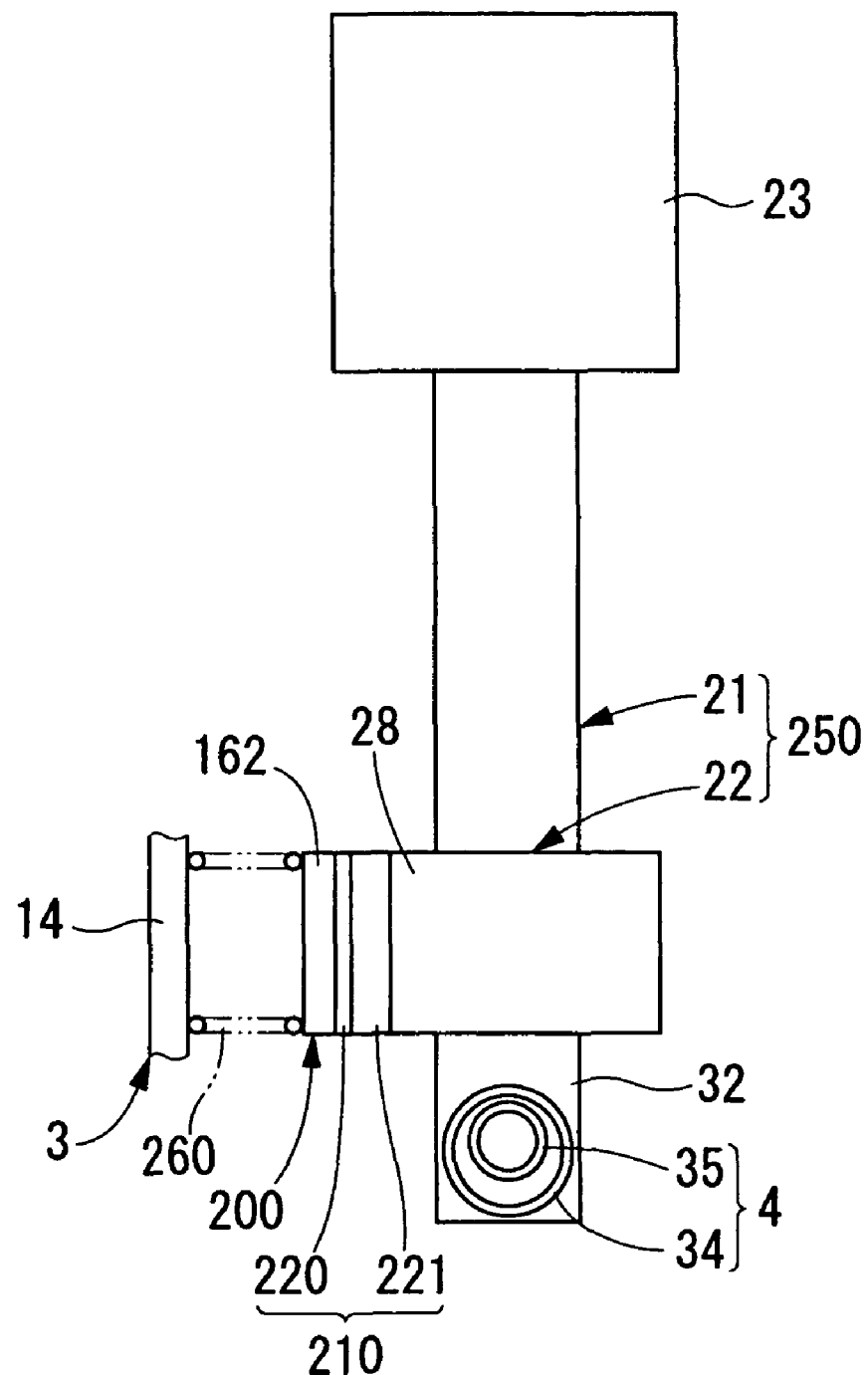
FIG. 12 is a schematic diagram showing a structure of a fifth embodiment of the present invention.

As shown in FIG. 12, a fifth embodiment of the present invention is a modification of the fourth embodiment.

In the accelerator pedal 250 of the fifth embodiment, the bevel gear teeth 30, 31 are not provided to the pedal arm 21 and the spring rotor 22, and the pedal arm 21 and the spring rotor 22 are integrated together. According to the fifth embodiment, a compression coil spring 260 is provided as an urging member between the friction member 200 and the lateral plate 14. The friction member 200 is urged against the rigid member 220 of the friction body 210 by the restoring force of the compression coil spring 260.

According to the fifth embodiment, when the pedal pressing operation is performed on the accelerator pedal 250, which is placed in the initial position, the advantages similar to those of the fourth embodiment can be achieved.

Figure 13:
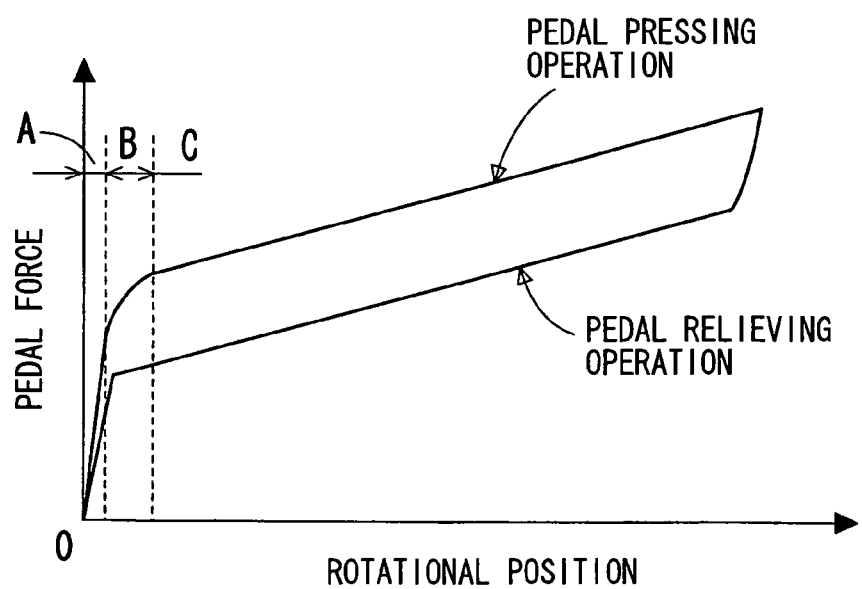
FIG. 13 is a schematic diagram showing characteristics of the fifth embodiment.

Furthermore, the pedal characteristics in the pedal pressing operation also have the steady range C after the ranges A, B, as shown in FIG. 13. In the steady range C, when the pedal force, which is applied to the manipulating portion 23, is increased to rotate the accelerator pedal 250 in the forward rotational direction, the restoring force of the double coil spring arrangement 4 is increased. At this time, a generally constant frictional force is exerted between the rigid member 220 and the friction member 200 in the reverse rotational direction of the accelerator pedal 250 due to the restoring force of the compression coil spring 260, and thereby the required pedal force is increased by the amount that corresponds to the restoring force of the double coil spring arrangement 4 (see FIG. 13).

Furthermore, according to the pedal characteristics at the time of performing the pedal relieving operation, when the accelerator pedal 250 is rotated in the reverse rotational direction due to the decrease in the pedal force applied to the manipulating portion 23, the restoring force of the double coil spring arrangement 4 is decreased. At this time, a generally constant frictional force is exerted between the rigid member 220 and the friction member 200 in the forward rotational direction of the accelerator pedal 250 due to the restoring force of the compression coil spring 260, and thereby the required pedal force is decreased by the amount that corresponds to the restoring force of the double coil spring arrangement 4 (see FIG. 13). Therefore, the hysteresis appears between the pedal characteristics at the time of performing the pedal relieving operation and the pedal characteristics at the time of performing the pedal pressing operation.

According to the fifth embodiment, the accelerator pedal 250 corresponds to the pedal of the invention.

Sixth Embodiment

As shown in FIG. 14, a sixth embodiment of the present invention is a modification of the fifth embodiment.

In the spring rotor 301 of the accelerator pedal 300 of the sixth embodiment, the spring receiver 310 is formed as a separate member, which is separated from the rotor main body 28, which is integral with the pedal arm 21. This spring receiver 310 is supported by the pedal arm 21.

Specifically, a recess 320 is formed in an end of the pedal arm 21, which is opposite from the manipulating portion 23. The recess 320 includes a flat section 321 and a slant section 322. The flat section 321 is generally parallel to a radial direction of the rotational axis of the accelerator pedal 300. The slant section 322 faces radially outward and is slanted, i.e., angled relative to the radial direction of the rotational axis of the accelerator pedal 300. The spring receiver 310 includes a flat section 311 and a slant section 312, which contact the flat section 321 and the slant section 322, respectively, of the recess 320. Furthermore, the spring receiver 310 includes a connective projection 313, which projects outward in the radial direction of the rotational axis of the accelerator pedal 300 upon installation of the spring receiver 310 in the recess 320.

Furthermore, according to the sixth embodiment, the friction member 200 and the compression coil spring 260 are eliminated, and a friction body 330, which is different from the friction body 210, is provided between the accelerator pedal 300 and the projecting plate 20. Specifically, the friction body 330 includes one rigid member 340 and one resilient member 341, which are integrated together. The rigid member 340 is made of, for example, resin and is engaged with an inner wall of the projecting plate 20. A connective hole 342 is formed in the rigid member 340 on a side that is opposite from the projecting plate 20. The resilient member 341 is made of rubber, which has a rigidity that is smaller than a rigidity of the rigid member 340 and a rigidity of the spring receiver 310. Furthermore, the resilient member 341 is shaped into a generally U-shaped body and is fixed to the interior of the connective hole 342 of the rigid member 340. When the connective projection 313 of the spring receiver 310 is fitted into the generally U-shaped resilient member 341, the resilient member 341 is held by the spring receiver 310. Thus, when the resilient member 341, which is held between the rigid member 340 and the spring receiver 310, is resiliently deformed, the rigid member 340 is displaced relative to the spring receiver 310 in the rotational direction of the accelerator pedal 300. As shown in FIG. 14, according to the present embodiment, a protrusion 344 of the rigid member 340 is loosely received in the pedal arm 21 in a manner that permits displacement of the protrusion 344 of the rigid member 340 relative to the spring receiver 310 and the pedal arm 21.

According to the sixth embodiment, when the pedal pressing operation is performed on the accelerator pedal 300, which is placed in the initial position, the rigid member 340 of the friction body 330 slides over the projecting plate 20 of the housing 3. Thus, friction is generated between the projection plate 20 and the rigid member 340 of the friction body 330, and thereby displacement of the rigid member 340 in the rotational direction of the accelerator pedal 2 is limited. At this time, in the friction body 330, the resilient member 341 is resiliently deformed between the rigid member 340 and the spring receiver 310 to permit the displacement of the spring receiver 310 relative to the rigid member 340. Thus, the rotor main body 28 and the pedal arm 21 are rotated together with the spring receiver 32 in the forward rotational direction. Therefore, the operator can move the accelerator pedal 300 from the initial position with a smaller pedal force, which is smaller than the resultant of the restoring force of the double coil spring arrangement 4 and the frictional force between the projecting plate 20 and the rigid member 340. As a result, the operational feeling of the accelerator pedal 300 is improved according to the principal, which is similar to that of the first embodiment, so that the drivability is improved at the time of starting the vehicle.

Figure 15:
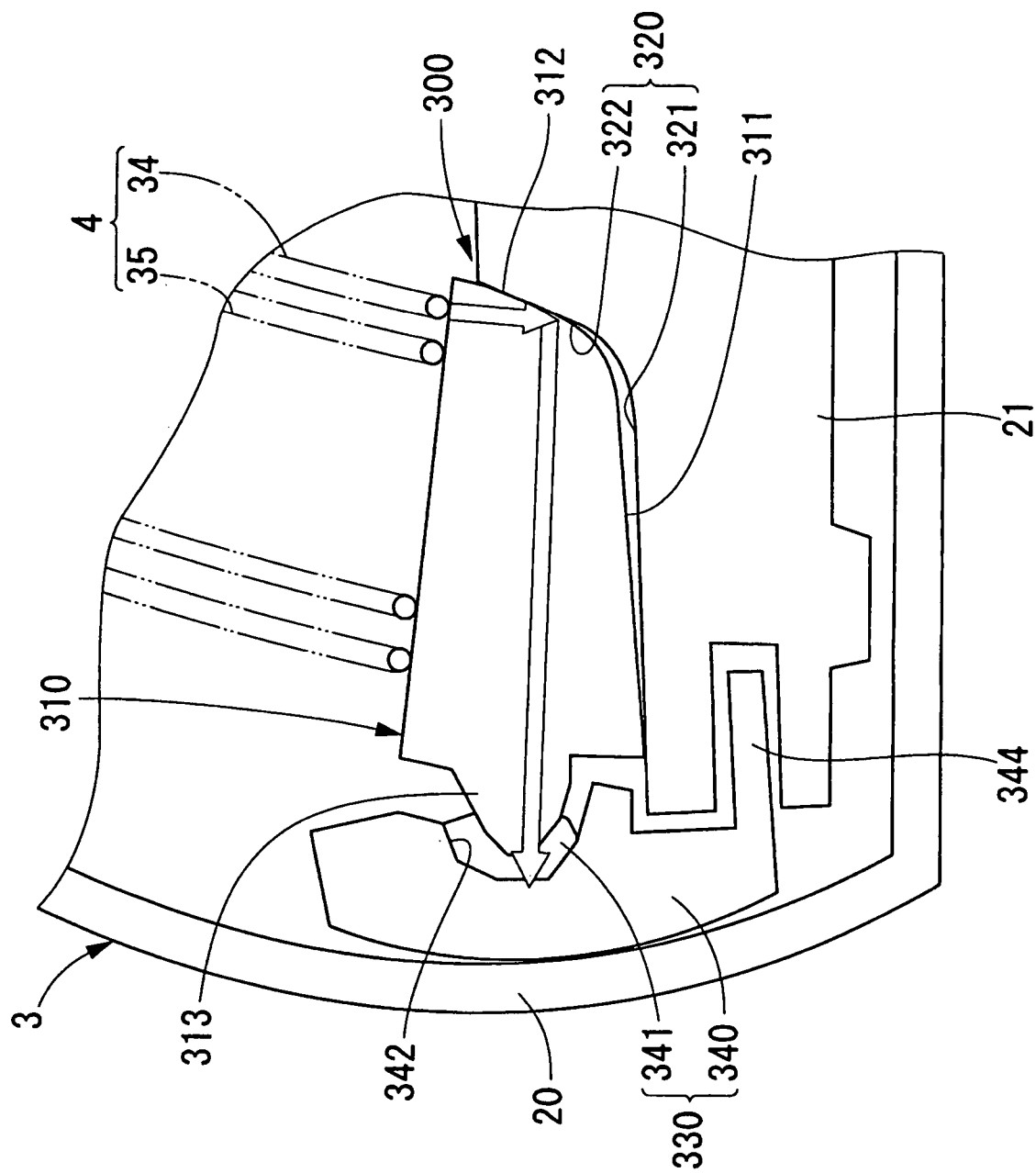
FIG. 15 is a schematic diagram showing an operation of the sixth embodiment.

Furthermore, the pedal characteristics at the time of performing the pedal pressing operation have the steady range C, which exists after the ranges A, B. In the steady range C, the restoring force of the double coil spring arrangement 4 is increased as the accelerator pedal 300 is rotated in the forward rotational direction due to the increase in the pedal force applied to the manipulating portion 23. In this way, as shown in FIG. 15, the slant section 312 of the spring receiver 310, which receives the restoring force of the double coil spring arrangement 4, is urged against the slant section 322 of the pedal arm 21. Therefore, as shown in FIG. 15, the rigid member 340 of the friction body 330 is urged against the projecting plate 20. Therefore, when the accelerator pedal 300 is rotated in the forward rotational direction, the frictional force, which is generated between the rigid member 340 and the projecting plate 20 in the reverse rotational direction of the accelerator pedal 300, is increased. As a result, the required pedal force is increased in response to the increase in the restoring force of the double coil spring arrangement 4.

Furthermore, according to the pedal characteristics at the time of performing the pedal relieving operation, when the accelerator pedal 300 is rotated in the reverse rotational direction due to the decrease in the pedal force applied to the manipulating portion 23, the restoring force of the double coil spring arrangement 4 is decreased. In this way, the urging force, which urges the slant section 312 of the spring receiver 310 against the slant section 322 of the pedal arm 21, is decreased, and thereby the urging force, which urges the rigid member 340 of the friction body 330 against the projecting plate 20, is decreased. Therefore, when the accelerator pedal 300 is rotated in the reverse rotational direction, the frictional force, which is generated between the rigid member 340 and the projecting plate 20 in the forward rotational direction of the accelerator pedal 300, is decreased. As a result, the required pedal force is decreased in response to the decrease in the restoring force of the double coil spring arrangement 4. Therefore, the hysteresis appears between the pedal characteristics at the time of performing the pedal relieving operation and the pedal characteristics at the time of performing the pedal pressing operation.

According to the sixth embodiment, it is not absolutely necessary to integrate the rigid member 340 and the resilient member 341 together. In a case where the rigid member 340 and the resilient member 341 are not integrated together, the resilient member 341 may be integrated with the connective projection 313 of the spring receiver 310.

In the sixth embodiment, the housing 3 corresponds to the supporting body of the invention, and the accelerator pedal 300 corresponds to the pedal of the invention. Furthermore, the friction body 330 corresponds to the friction means of the invention, and the rigid member 340 corresponds to the sliding part of the invention. Also, the resilient member 341 corresponds to the resiliently deformable part of the invention.

Seventh Embodiment

Figure 16:
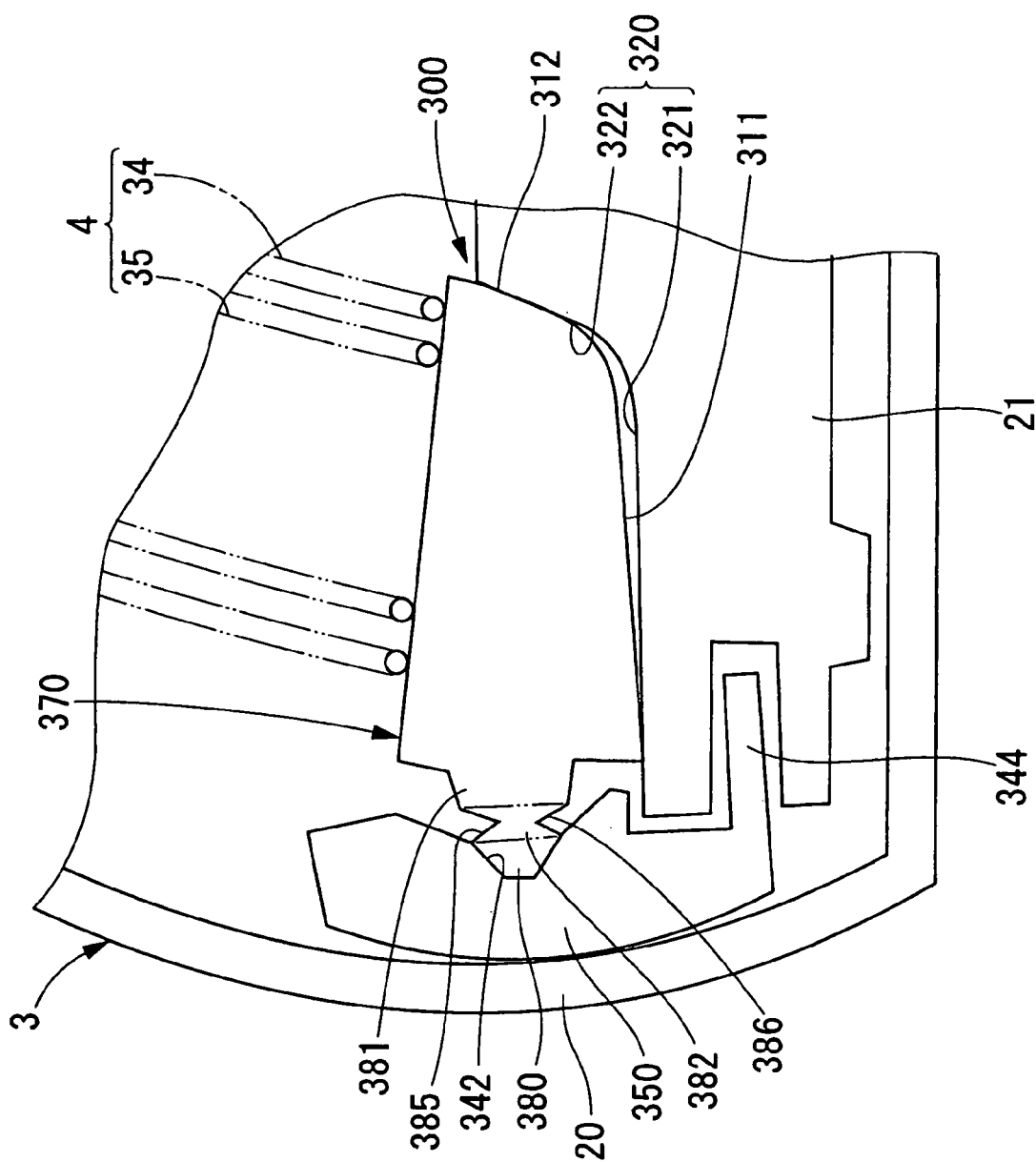
FIG. 16 is a schematic diagram showing a structure of a seventh embodiment of the present invention.

As shown in FIG. 16, a seventh embodiment of the present invention is a modification of the sixth embodiment.

In the seventh embodiment, a friction member 350 is provided in place of the friction body 330. The structure of the friction member 350 is substantially the same as that of the friction body 330 except that the resilient member 341 is removed from the friction body 330.

Furthermore, a spring receiver 370, which serves as a separate member that is separated from the rotor main body 28, conducts the pedal force of the operator and the restoring force of the double coil spring arrangement 4 to the friction member 350. Specifically, the spring receiver 370 includes an engaging part 380, a holding part 381 and a resiliently deformable part 382 in place of the connective projection 313. In FIG. 16, each of a boundary between the engaging part 380 and the resiliently deformable part 382 and a boundary between the holding part 381 and the resiliently deformable part 382 is indicated by a corresponding dot-dot-dash line. The engaging part 380 engages the interior of the connective hole 342 of the friction member 350. Similar to the spring receiver 310 of the sixth embodiment, the holding part 381 forms the flat section 311 and the slant section 312 and is held by the recess 320 of the pedal arm 21. The resiliently deformable part 382 connects between the engaging part 380 and the holding part 381. Two recesses 385, 386 are formed on the opposed sides of the resiliently deformable part 382, which are opposed to each other in the rotational direction of the accelerator pedal 300. A circumferential width of the resiliently deformable part 382, which is measured in the rotational direction of the accelerator pedal 300, is set to be smaller than that of the engaging part 380 and that of the holding part 381. In this way, the resiliently deformable part 382 is resiliently deformable between the engaging part 380 and the holding part 381 to allow displacement of the holding part 381 relative to the engaging part 380 in the rotational direction of the accelerator pedal 300.

According to the seventh embodiment, when the pedal pressing operation is performed on the accelerator pedal 300, which is placed in the initial position, the friction member 350 slides over the projecting plate 20. Thus, friction is generated between the friction member 350 and the projecting plate 20, and thereby displacement of the friction member 350 in the rotational direction of the accelerator pedal 300 is limited. At this time, displacement of the engaging part 380 of the spring receiver 370, which engages the friction member 350, is also limited in the rotational direction of the accelerator pedal 300. Furthermore, at this time, the resiliently deformable part 382 of the spring receiver 370 is resiliently deformed between the engaging part 380 and the holding part 381 to permit the displacement of the holding part 381 relative to the engaging part 380. Thus, the rotor main body 28 and the pedal arm 21 are rotated together with the holding part 381 in the forward rotational direction. Therefore, the operator can move the accelerator pedal 300 from the initial position with a smaller pedal force, which is smaller than the resultant of the restoring force of the double coil spring arrangement 4 and the frictional force between the friction member 350 and the projecting plate 20. As a result, the operational feeling of the accelerator pedal 300 is improved according to the principal, which is similar to that of the first embodiment, so that the drivability is improved at the time of starting the vehicle.

In the seventh embodiment, the pedal arm 21 corresponds to a rotatable part of the invention, and the spring receiver 370 corresponds to a conducting means and a conducting member of the invention.

Eighth Embodiment

Figure 17:
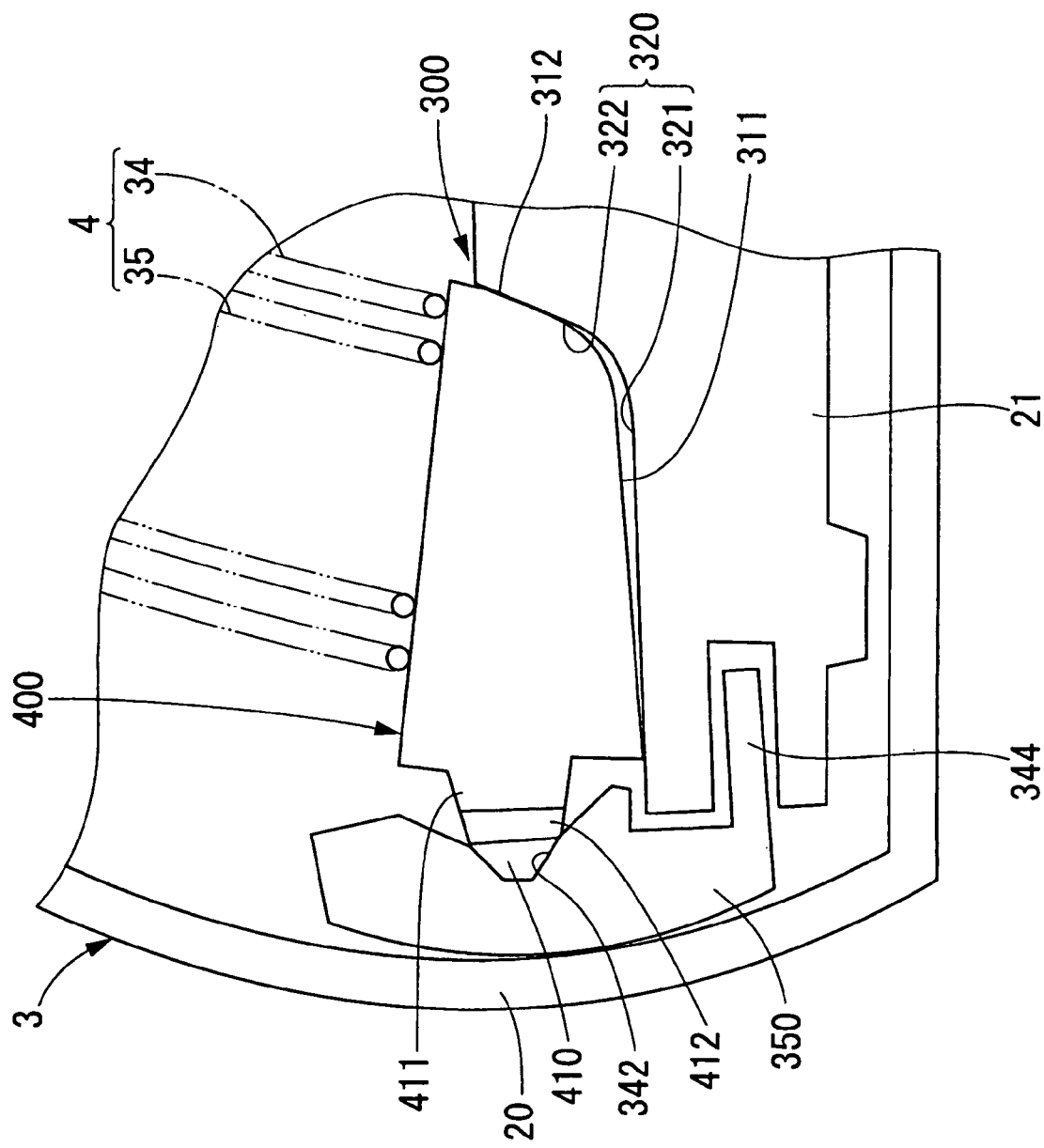
FIG. 17 is a schematic diagram showing a structure of an eighth embodiment of the present invention.

As shown in FIG. 17, an eighth embodiment of the present invention is a modification of the seventh embodiment.

In the eighth embodiment, a spring receiver 400, which conducts the pedal force of the operator and the restoring force of the double coil spring arrangement 4 to the friction member 350, includes two rigid members (i.e., first and second rigid members) 410, 411 and one resilient member 412, which are integrated together. The first rigid member 410 is made of, for example, resin and has the structure, which is substantially the same as that of the engaging part 380 of the seventh embodiment. Furthermore, the second rigid member 411 is made of, for example, resin and has substantially the same structure as that of the holding part 381 of the seventh embodiment. Furthermore, the resilient member 412 is held between the first rigid member 410 and the second rigid member 411 and is made of, for example, rubber that has a rigidity lower than that of the first and second rigid members 410, 411. Therefore, when the resilient member 412 is resiliently deformed, the second rigid member 411 is displaced relative to the first rigid member 410 in the rotational direction of the accelerator pedal 300.

In the eighth embodiment, when the pedal pressing operation is performed on the accelerator pedal 300, which is placed in the initial position, displacement of the friction member 350 and the first rigid member 410 is limited since the first rigid member 410 of the spring receiver 400 engages the friction member 350, which generates the friction between the friction member 350 and the projecting plate 20. At this time, the resilient member 412 of the spring receiver 400 is resiliently deformed between the first rigid member 410 and the second rigid member 411 to permit displacement of the second rigid member 411 relative to the first rigid member 410. Thus, the rotor main body 28 and the pedal arm 21 are rotated together with the second rigid member 411 in the forward rotational direction. Therefore, the operator can move the accelerator pedal 300 from the initial position with a smaller pedal force, which is smaller than the resultant of the restoring force of the double coil spring arrangement 4 and the frictional force between the friction member 350 and the projecting plate 20. As a result, the operational feeling of the accelerator pedal 300 is improved according to the principal, which is similar to that of the first embodiment, so that the drivability is improved at the time of starting the vehicle.

According to the eighth embodiment, the spring receiver 400 corresponds to the conducting means and the conducting member of the invention, and the first rigid member 410 corresponds to the engaging part of the invention. Furthermore, the second rigid member 411 corresponds to the holding part of the invention, and the resilient member 412 corresponds to the resiliently deformable part of the invention.

Ninth Embodiment

Figure 18:
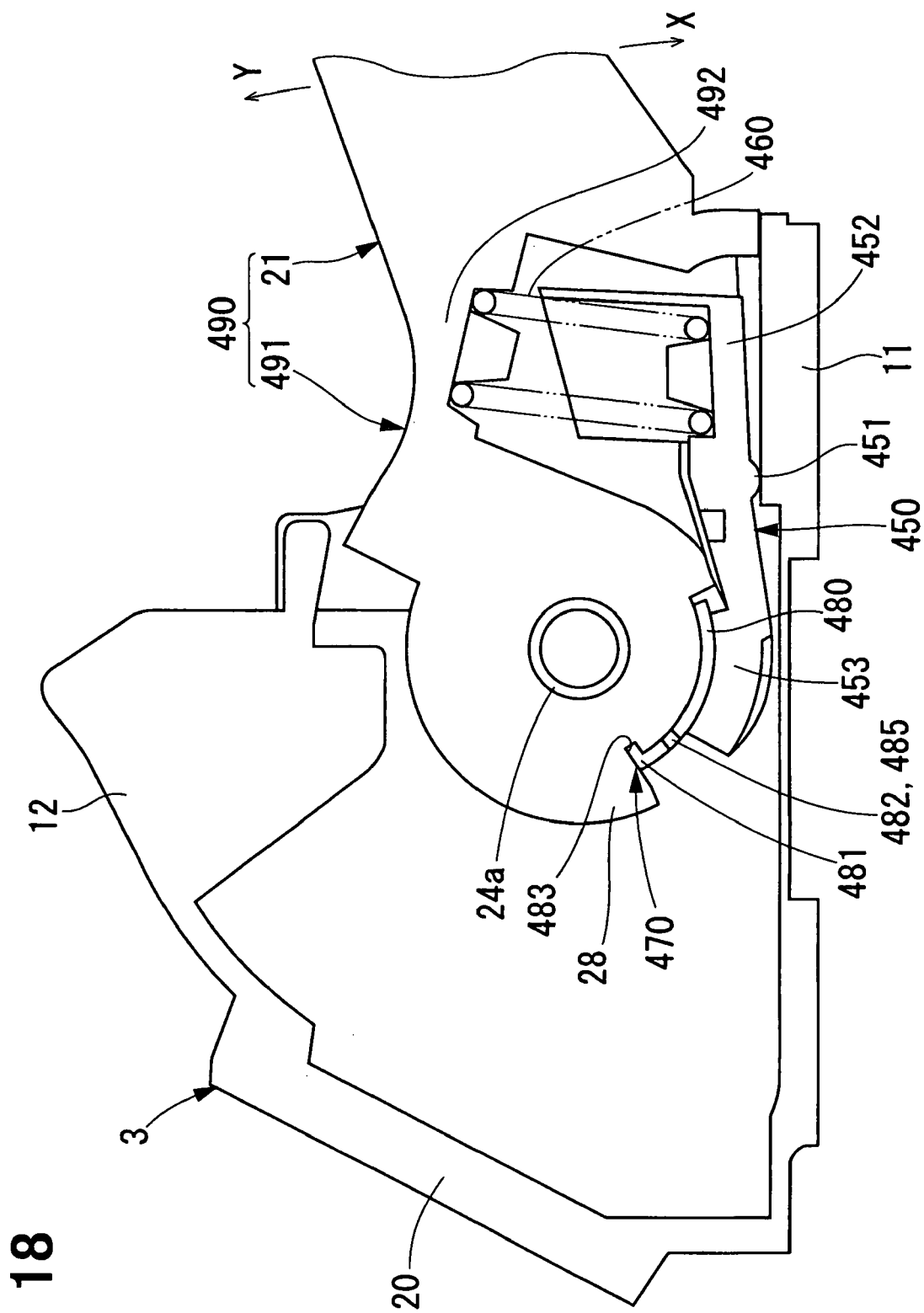
FIG. 18 is a schematic diagram showing a structure of a ninth embodiment of the present invention.
Figure 19:
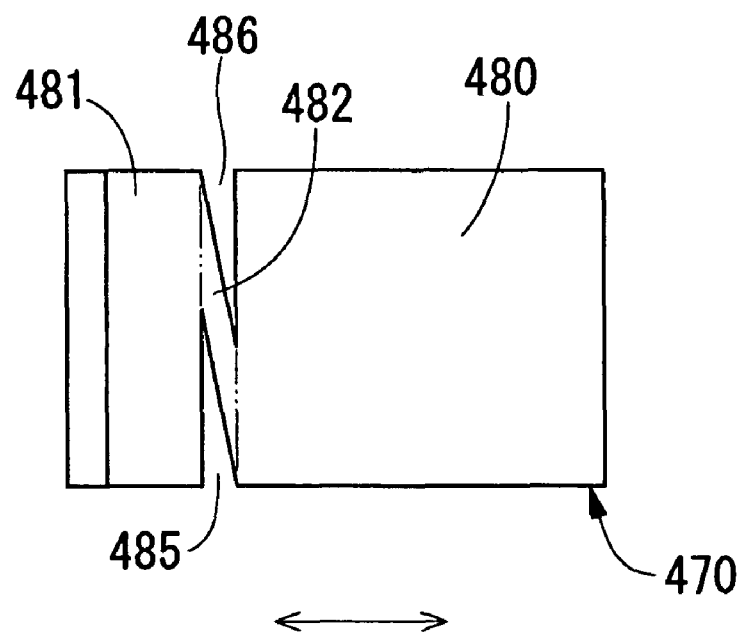
FIG. 19 is a schematic diagram showing a structural component of the ninth embodiment.

As shown in FIGS. 18 and 19, a ninth embodiment of the present invention is a modification of the fifth embodiment.

As sown in FIG. 18, in an accelerator pedal 490 of the ninth embodiment, a spring receiver 492 of a spring rotor 491, which is integrated with the pedal arm 21, is provided to the shaft portion 24a on the manipulating portion 23 side thereof.

Furthermore, in the ninth embodiment, a supporting member 450 is provided in place of the friction member 200, and a compression coil spring 460 is provided in place of the double coil spring arrangement 4 and the compression coil spring 260.

Specifically, the supporting member 450 includes a rocker shaft portion 451, which is generally parallel with the shaft portion 24a of the accelerator pedal 490 and is rockably supported by a bottom plate 11. A locking part 452 and a friction part 453 are formed on opposite sides, respectively, of the rocker shaft portion 451 of the supporting member 450.

One end of the compression coil spring 460 is locked to the locking part 452 of the supporting member 450, and the other end of the compression coil spring 460 is locked to the spring receiver 492 of the accelerator pedal 490. That is, the locking part 452 supports the accelerator pedal 490 through the compression coil spring 460. Therefore, the restoring force of the compression coil spring 460 is applied to the locking part 452, so that the supporting member 450 is rocked according to the degree of the restoring force of the compression coil spring 460. Furthermore, the restoring force of the compression coil spring 460 is applied to the spring receiver 492 in the reverse rotational direction of the accelerator pedal 490, which is indicated by "Y" in FIG. 18.

In the ninth embodiment, a friction member 470 is provided in place of the friction body 210. Specifically, the friction member 470 is made of, for example, resin and is shaped into a plate form. Furthermore, the friction member 470 is generally arcuately curved along an outer peripheral wall of the rotor main body 28 of the spring rotor 491. As shown in FIGS. 18 and 19, the friction member 470 includes a sliding part 480, a holding part 481 and a resiliently deformable part 482. In FIG. 19, each of a boundary between the sliding part 480 and the resiliently deformable part 482 and a boundary between the holding part 481 and the resiliently deformable part 482 is indicated by a corresponding dot-dot-dash line. The sliding part 480 engages the friction part 453 of the supporting member 450. The holding part 481 engages a groove 483, which is formed in the outer peripheral wall of the rotor main body 28, so that the holding part 481 is held by the spring rotor 491. The resiliently deformable part 482 connects between the sliding part 480 and the holding part 481. Two recesses 485, 486 are formed on the opposed sides of the resiliently deformable part 482, which are opposed to each other in the rotational direction of the accelerator pedal 490. A circumferential width of the resiliently deformable part 482, which is measured in the rotational direction of the accelerator pedal 490, is set to be smaller than that of the sliding part 480 and that of the holding part 481. In this way, the resiliently deformable part 482 can resiliently deform between the sliding part 480 and the holding part 481. When the resiliently deformable part 482 is resiliently deformed, the holding part 481 is displaced relative to the sliding part 480 in the rotational direction of the accelerator pedal 490. In the present embodiment, the recesses 485, 486 are displaced from each other in the rotational direction of the accelerator pedal 490, so that the resiliently deformable part 482 can more easily deformed.

According to the ninth embodiment, when the pedal pressing operation is performed on the accelerator pedal 490, which is placed in the initial position, the sliding part 480 of the friction member 470 slides over friction part 453 of the supporting member 450. Thus, friction is generated between the sliding part 480 of the friction member 470 and the friction part 453 of the supporting member 450, and thereby displacement of the sliding part 480 of the friction member 470 in the rotational direction of the accelerator pedal 490 is limited. At this time, the resiliently deformable part 482 of the friction member 470 is resiliently deformed between the sliding part 480 and the holding part 481, which is held by the spring rotor 491, to permit displacement of the holding part 481 relative to the sliding part 480. Thus, the spring rotor 491 and the pedal arm 21 are rotated together with the holding part 481 in the forward rotational direction. Therefore, the operator can move the accelerator pedal 490 from the initial position with a smaller pedal force, which is smaller than the resultant of the restoring force of the compression coil spring 460 and the frictional force between the friction member 470 and the supporting member 450. As a result, the operational feeling of the accelerator pedal 490 is improved according to the principal, which is similar to that of the first embodiment, so that the drivability is improved at the time of starting the vehicle.

Figure 20:
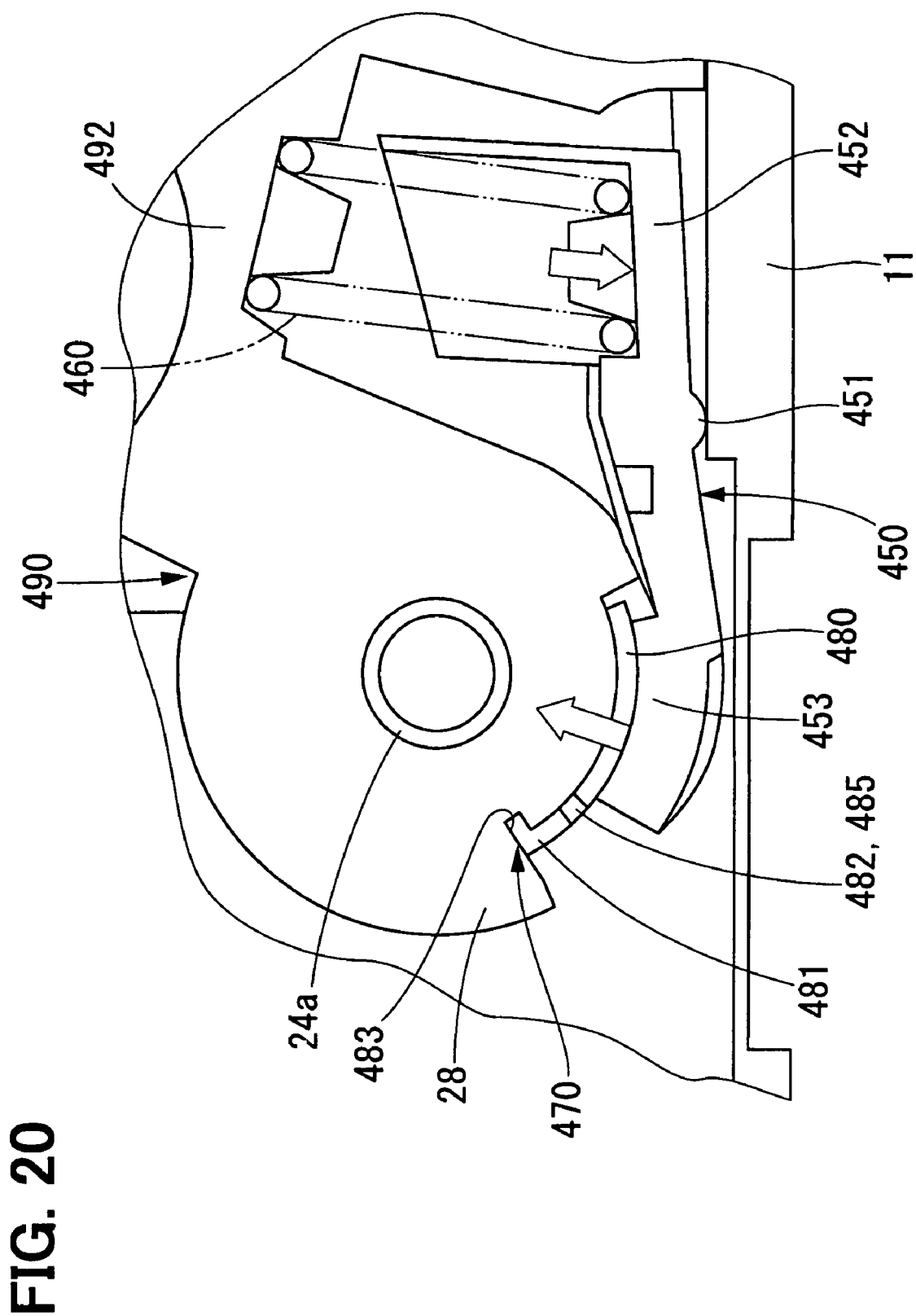
FIG. 20 is a schematic diagram showing an operation of the ninth embodiment.
Figure 22:
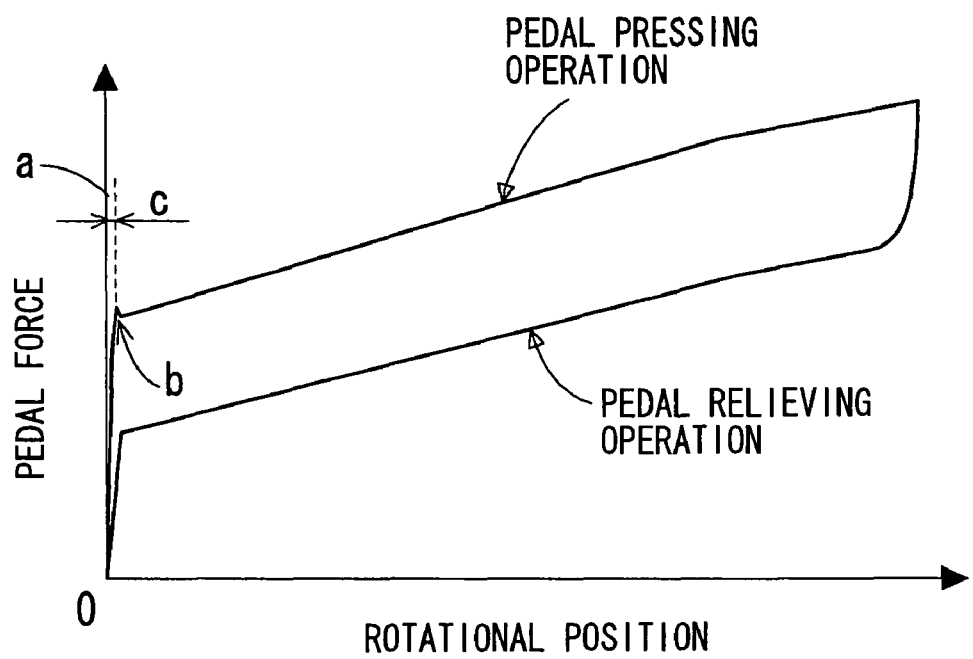
FIG. 22 is a schematic diagram showing characteristics of a prior art technique.

Furthermore, the pedal characteristics at the time of performing the pedal pressing operation have the steady range C, which exists after the ranges A, B. In the steady range C, the restoring force of the compression coil spring 460 is increased as the accelerator pedal 490 is rotated in the forward rotational direction due to the increase in the pedal force applied to the manipulating portion 23. In this way, the friction part 453 of the supporting member 450, which receives the restoring force of the compression coil spring 460, is urged against the sliding part 480 of the friction member 470, as shown in FIG. 20. Therefore, when the accelerator pedal 490 is rotated in the forward rotational direction, the frictional force, which is exerted in the reverse rotational direction of the accelerator pedal 490 between the supporting member 450 and the friction member 470, is increased. As a result, the required pedal force is increased in response to the increase in the restoring force of the compression coil spring 460.

Furthermore, according to the pedal characteristics at the time of performing the pedal relieving operation, when the accelerator pedal 490 is rotated in the reverse rotational direction due to the decrease in the pedal force applied to the manipulating portion 23, the restoring force of the compression coil spring 460 is decreased. In this way, the urging force, which urges the friction part 453 of the supporting member 450 against the sliding part 480 of the friction member 470, is decreased. Therefore, when the accelerator pedal 490 is rotated in the reverse rotational direction, the frictional force, which is exerted in the forward rotational direction of the accelerator pedal 490 between the supporting member 450 and the friction member 470, is decreased. As a result, the required pedal force is decreased in response to the decrease in the restoring force of the compression coil spring 460. Therefore, the hysteresis appears between the pedal characteristics at the time of performing the pedal relieving operation and the pedal characteristics at the time of performing the pedal pressing operation.

In the ninth embodiment, the compression coil spring 460 corresponds to the restoring force applying means of the invention, and the accelerator pedal 490 corresponds to the pedal of the invention. Furthermore, the housing 3 and the supporting member 450 cooperate together to serve as the supporting body of the invention. Furthermore, the friction member 470 corresponds to the friction means of the invention.

Tenth Embodiment

Figure 21:
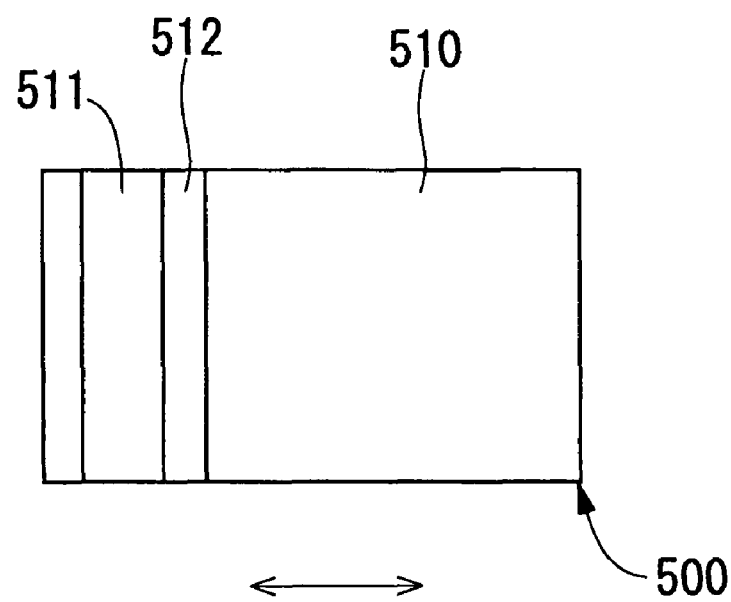
FIG. 21 is a schematic diagram showing a structural component of a tenth embodiment of the present invention.

As shown in FIG. 21, a tenth embodiment of the present invention is a modification of the ninth embodiment.

In the tenth embodiment, a friction body 500 is provided in place of the friction member 470. Specifically, the friction body 500 includes two rigid members (i.e., first and second rigid members) 510, 511 and one resilient member 512, which are integrated together. The first rigid member 510 is made of, for example, resin and has substantially the same structure as that of the sliding part 480 of the ninth embodiment. Furthermore, the second rigid member 511 is made of, for example, resin and has substantially the same structure as that of the holding part 481 of the ninth embodiment. Furthermore, the resilient member 512 is held between the first rigid member 510 and the second rigid member 511 and is made of, for example, rubber that has a rigidity lower than that of the first and second rigid members 510, 511. Therefore, when the resilient member 512 is resiliently deformed, the second rigid member 511 is displaced relative to the first rigid member 510 in the rotational direction of the accelerator pedal 490.

According to the tenth embodiment, when the pedal pressing operation is performed on the accelerator pedal 490, which is placed in the initial position, the first rigid member 510 of the friction body 500 slides over the friction part 453 of the supporting member 450. Thus, friction is generated between the first rigid member 510 and the friction part 453, and thereby displacement of the first rigid member 510 in the rotational direction of the accelerator pedal 490 is limited. At this time, the resilient member 512 of the friction body 500 is resiliently deformed between the first rigid member 510 and the second rigid member 511, which is held by the spring rotor 491, so that the second rigid member 511 is displaced relative to the first rigid member 510. Thus, the spring rotor 491 and the pedal arm 21 are rotated together with the second rigid member 511 in the forward rotational direction. Therefore, the operator can move the accelerator pedal 490 from the initial position with a smaller pedal force, which is smaller than the resultant of the restoring force of the compression coil spring 460 and the frictional force between the friction member 470 and the supporting member 450. As a result, the operational feeling of the accelerator pedal 490 is improved according to the principal, which is similar to that of the first embodiment, so that the drivability is improved at the time of starting the vehicle.

According to the tenth embodiment, the friction body 500 corresponds to the friction means of the invention, and the first rigid member 510 corresponds to the sliding part of the invention. Furthermore, the second rigid member 511 corresponds to the holding part of the invention, and the resilient member 512 corresponds to the resiliently deformable part of the invention.

The various embodiments of the present invention have been described. However, the present invention is not limited to the above embodiments, and thereby the above embodiments may be modified in various ways without departing from the scope and spirit of the invention.

For example, in the first to third embodiments the pedal arm 21 and the spring rotor 22 may be integrated together like in the fifth embodiment, and the compression coil spring 260, which urges the friction member 10, the friction body 100 or the friction body 150 against the rotor main body 28 on the lateral wall section 25 side thereof, may be provided.

In the ninth embodiment, the holding part 481 of the friction member 470 may be held by the friction part 453 of the supporting member 450, and the sliding part 480 of the friction member 470 may slide over the outer peripheral wall of the rotor main body 28.

In the tenth embodiment, the second rigid member 511 may be eliminated from the friction body 500, and the resilient member 512 of the friction body may be directly held by the rotor main body 28. Also, in the tenth embodiment, the second rigid member 511 of the friction body 500 may be held by the friction part 453 of the supporting member 450, and the friction body 500 may slide over the outer peripheral wall of the rotor main body 28. In the tenth embodiment, the second rigid member 511 may be eliminated from the friction body 500, and the resilient member 512 of the friction body 500 may be held by the friction part 453 of the supporting member 450. Also, the first rigid member 510 of the friction body 500 may slide over the outer peripheral wall of the rotor main body 28.

Furthermore, the present invention may be applied to a pedal module other than that of the vehicle accelerator apparatus.

Additional advantages and modifications will readily occur to those skilled in the art. The invention in its broader terms is therefore not limited to the specific details, representative apparatus, and illustrative examples shown and described.

What is claimed is:

1. A pedal module comprising:
   a restoring force exerting means for exerting a restoring force;
   a pedal that is rotated about a rotation axis of the pedal in a forward rotational direction by a pedal force and is rotated about the rotational axis of the pedal in a reverse rotational direction by the restoring force;
   a supporting body that supports the pedal and which is configured to be fixedly attached to a vehicle body; and
   a friction means for generating friction between the pedal and the friction means, wherein the friction means includes:
   a sliding part that slidably engages a surface that is moved integrally with the pedal by rotation of the pedal; and
   a resiliently deformable part that contacts and is fixed to the supporting body and is resiliently deformable between the supporting body and the sliding part to permit initial rotational displacement of the sliding part together with the pedal relative to the supporting body through dragging of the sliding part on the surface upon rotation of the pedal until the sliding part begins to slide over the surface,
   wherein the sliding part includes a slidable main body, which is configured as a hollow cylindrical body extending about a central axis of the slidable main body and slidably engages the surface that is moved integrally with the pedal by the rotation of the pedal; and a projection, which outwardly projects from the slidable main body;
   the supporting body has a fitting hole, in which the projection of the sliding part is held through the resiliently deformable part; and
   the central axis of the slidable main body generally coincides with the rotational axis of the pedal.

2. The pedal module according to claim 1, wherein:
   the sliding part is a rigid member; and
   the resiliently deformable part is a resilient member, which has a rigidity lower than a rigidity of the supporting body and a rigidity of the rigid member and is held between the supporting body and the rigid member.

3. The pedal module according to claim 1, wherein the pedal module is a vehicle accelerator apparatus, and the pedal is an accelerator pedal.

4. The pedal module according to claim 1, wherein the projection radially outwardly projects from the slidable main body.

5. The pedal module according to claim 1, wherein the slidable main body circumferentially extends all around the rotational axis of the pedal.

6. The pedal module according to claim 1, wherein the slidable main body slidably engages the surface in a direction parallel to both of the rotational axis of the pedal and the central axis of the slidable main body.

7. A pedal module comprising:
- a restoring force exerting means for exerting a restoring force;
- a pedal that is rotated in a forward rotational direction by a pedal force and is rotated in a reverse rotational direction by the restoring force;
- a supporting body that supports the pedal and which is configured to be fixedly attached to a vehicle body; and
- a friction means for generating friction between the pedal and the friction means, wherein the friction means includes:
- a sliding part that slidably engages a surface that is moved integrally with the pedal by rotation of the pedal; and
- a resiliently deformable part that contacts and is fixed to the supporting body and is resiliently deformable between the supporting body and the sliding part to permit initial rotational displacement of the sliding part together with the pedal relative to the supporting body through dragging of the sliding part on the surface upon rotation of the pedal until the sliding part begins to slide over the surface,
- wherein the sliding part includes a slidable main body, which is configured as a hollow cylindrical body and slidably engages the surface that is moved integrally with the pedal by the rotation of the pedal; and a projection, which outwardly projects from the slidable main body;
- the supporting body has a fitting hole, in which the projection of the sliding part is held through the resiliency deformable part; and
- the projection radially outwardly projects from the slidable main body.

8. The pedal module according to claim 7, wherein:
the sliding part is a rigid member; and
the resiliency deformable part is a resilient member, which has a rigidity lower than a rigidity of the supporting body and a rigidity of the rigid member and is held between the supporting body and the rigid member.

9. The pedal module according to clam 7, wherein the pedal module is a vehicle accelerator apparatus, and the pedal is an accelerator pedal.

* * * * *